(12) United States Patent
Iwasa et al.

(10) Patent No.: US 9,912,895 B2
(45) Date of Patent: Mar. 6, 2018

(54) SOLID-STATE IMAGE PICKUP DEVICE, SIGNAL PROCESSING METHOD FOR THE SAME, AND IMAGE PICKUP APPARATUS USING THE SAME

(71) Applicant: SONY CORPORATION, Tokyo (JP)

(72) Inventors: Hiroshi Iwasa, Kanagawa (JP); Satoshi Ogata, Nagasaki (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 14/685,074

(22) Filed: Apr. 13, 2015

(65) Prior Publication Data

US 2015/0222837 A1 Aug. 6, 2015

Related U.S. Application Data

(63) Continuation of application No. 12/476,963, filed on Jun. 2, 2009, now Pat. No. 9,036,062.

(30) Foreign Application Priority Data

Jun. 20, 2008 (JP) .................................. 2008-161415
Oct. 7, 2008 (JP) .................................. 2008-260302

(51) Int. Cl.
| | | |
|---|---|---|
| H04N 3/14 | (2006.01) | |
| H04N 5/335 | (2011.01) | |
| H04N 5/378 | (2011.01) | |
| H04N 5/232 | (2006.01) | |
| H04N 5/347 | (2011.01) | |
| H04N 5/3745 | (2011.01) | |

(52) U.S. Cl.
CPC .......... *H04N 5/378* (2013.01); *H04N 5/23232* (2013.01); *H04N 5/347* (2013.01); *H04N 5/37455* (2013.01)

(58) Field of Classification Search
CPC ............... H04N 5/378; H04N 5/37455; H04N 5/23232; H04N 5/347
See application file for complete search history.

(56) References Cited

U.S. PATENT DOCUMENTS

| | | | |
|---|---|---|---|
| 2005/0195304 | A1 | 9/2005 | Nitta et al. |
| 2006/0012696 | A1 * | 1/2006 | Zarnowski ............ H03M 1/123 348/294 |
| 2008/0055432 | A1 | 3/2008 | Koseki |
| 2008/0170137 | A1 | 7/2008 | Matsumoto et al. |

FOREIGN PATENT DOCUMENTS

| | | |
|---|---|---|
| JP | 2005-278135 | 10/2005 |
| JP | 2009-060545 | 3/2009 |

\* cited by examiner

*Primary Examiner* — Alicia M Harrington
(74) *Attorney, Agent, or Firm* — Michael Best & Friedrich LLP

(57) ABSTRACT

A solid-state image pickup device includes: comparators; counters; and a control portion for carrying out control in such a way that in a phase of an addition mode, the two comparators and the two counters corresponding to the two pixel columns, respectively, are set as a unit, 1 is added to a second digit of one counter of the two counters when both the comparison results from the two comparators has a first logic, 1 is added to a first digit of the one counter when one of the comparison results from the two comparators has the first logic, and 1 is added to none of the first digit and the second digit of the one counter when both the comparison results from the two comparators has a second logic.

21 Claims, 19 Drawing Sheets

FIG. 10A CHANGE IN FIRST DIGIT (out1)

| | | | R2 | 0 | 0 | 1 | 1 |
|---|---|---|---|---|---|---|---|
| | | | R1 | 0 | 1 | 1 | 0 |
| Vco(i+1) | Vco(i) | Vco(i-1) | | | | | |
| 0 | 0 | 0 | | 0 | 0 | 0 | 0 |
| 0 | 0 | 1 | | 1 | 1 | 1 | 1 |
| 0 | 1 | 1 | | 0 | 0 | 0 | 0 |
| 0 | 1 | 0 | | 1 | 1 | 1 | 1 |
| 1 | 1 | 0 | | 0 | 0 | 0 | 0 |
| 1 | 1 | 1 | | 1 | 1 | 1 | 1 |
| 1 | 0 | 1 | | 0 | 0 | 0 | 0 |
| 1 | 0 | 0 | | 1 | 1 | 1 | 1 |

FIG. 10B CHANGE IN SECOND DIGIT (out2)

| | | | R2 | 0 | 0 | 1 | 1 |
|---|---|---|---|---|---|---|---|
| | | | R1 | 0 | 1 | 1 | 0 |
| Vco(i+1) | Vco(i) | Vco(i-1) | | | | | |
| 0 | 0 | 0 | | 0 | 0 | 0 | 0 |
| 0 | 0 | 1 | | 0 | 1 | 1 | 0 |
| 0 | 1 | 1 | | 1 | 1 | 1 | 1 |
| 0 | 1 | 0 | | 0 | 1 | 1 | 0 |
| 1 | 1 | 0 | | 1 | 1 | 1 | 1 |
| 1 | 1 | 1 | | 1 | 0 | 0 | 1 |
| 1 | 0 | 1 | | 1 | 1 | 1 | 1 |
| 1 | 0 | 0 | | 0 | 1 | 1 | 0 |

FIG. 10C CHANGE IN THIRD DIGIT (out3)

| | | | R2 | 0 | 0 | 1 | 1 |
|---|---|---|---|---|---|---|---|
| | | | R1 | 0 | 1 | 1 | 0 |
| Vco(i+1) | Vco(i) | Vco(i-1) | | | | | |
| 0 | 0 | 0 | | 0 | 0 | 0 | 0 |
| 0 | 0 | 1 | | 0 | 0 | 1 | 0 |
| 0 | 1 | 1 | | 0 | 0 | 1 | 1 |
| 0 | 1 | 0 | | 0 | 0 | 1 | 0 |
| 1 | 1 | 0 | | 0 | 0 | 1 | 1 |
| 1 | 1 | 1 | | 0 | 1 | 1 | 1 |
| 1 | 0 | 1 | | 0 | 0 | 1 | 1 |
| 1 | 0 | 0 | | 0 | 0 | 1 | 0 |

PIXEL B48+PIXEL B68+PIXEL B88
(+)
PIXEL B46+PIXEL B66+PIXEL B86
(+)
PIXEL B44+PIXEL B64+PIXEL B84

SOLID-STATE IMAGE PICKUP DEVICE, SIGNAL PROCESSING METHOD FOR THE SAME, AND IMAGE PICKUP APPARATUS USING THE SAME

CROSS REFERENCES TO RELATED APPLICATIONS

The subject matter of application Ser. No. 12/476,963 is incorporated herein by reference. The present application is a Continuation of U.S. Ser. No. 12/476,963, filed Jun. 2, 2009, which claims priority to Japanese Patent Application JP 2008-161415 filed in the Japanese Patent Office on Jun. 20, 2008, and to Japanese Patent Application JP 2008-260302 filed in the Japanese Patent Office on Oct. 7, 2008, the entire contents of which being incorporated herein by reference.

BACKGROUND OF THE INVENTION

1. Field of the Invention

The present invention relates to a solid-state image pickup device, a signal processing method for the same, and an image pickup apparatus using the same, and more particularly to a solid-state image pickup device utilizing a so-called Column Analog-to-Digital Conversion (ADC) system, a signal processing method for the same, and an image pickup apparatus using the same.

2. Description of the Related Art

An amplification type solid-state image pickup device as one kind of X-Y address type solid-state image pickup device, for example, a CMOS type (including a MOS type) solid-state image pickup device (hereinafter referred to as "a CMOS image sensor") is known as one system of solid-state image pickup devices. A technique called a column system is known in this CMOS image sensor. In the column system, column processing portions are provided independently of one another so as to correspond to pixel columns, respectively, for a pixel array portion in which pixels including respective photo-electric conversion elements are two-dimensionally disposed in a matrix. Also, signals (pixel signals) are successively read out every pixel column from the respective pixels in the pixel array portion to be temporarily held in the corresponding one of the column processing portions. Also, the pixel signals for one column are successively read out at a predetermined timing.

In addition, a column Analog-to-Digital Conversion (ADC) system with which a column processing portion is given an ADC function is known as one kind of column system. With this column ADC system, a comparator compares an analog pixel signal with a reference signal having a RAMP waveform, thereby generating a pulse signal having a size (pulse width), in a time axis direction, corresponding to a size of the pixel signal. Also, a counter counts predetermined clock signals for a time period corresponding to the pulse width of the pulse signal, and the resulting count value is set as a digital signal corresponding to the size of the pixel signal. In such a manner, the AD conversion is carried out.

In the CMOS image sensor using such a column ADC system, a so-called thinning reading method of thinning (skipping) pixel information to read out the resulting pixel information is known as a method of increasing a frame rate. However, when the thinning reading method is used, since although the electric charges are accumulated through the photoelectric conversion, there are some pixels from which the electric charges accumulated therein are discarded, the sensitivity is reduced. In order to solve a problem about the reduction of the sensitivity, heretofore, analog pixel signals outputted from respective unit pixels are converted into digital values by utilizing a column ADC system, and the resulting digital values corresponding to a plurality of pixels in a vertical direction, respectively, are added to one another to be read out. This technique, for example, is disclosed in Japanese Patent Laid-Open No. 2005-278135 (hereinafter referred to as Patent Document 1).

SUMMARY OF THE INVENTION

With the related art disclosed in Patent Document 1, there is a limit to an increase in frame rate because both the thinning reading method and the addition for the pixels are realized only in the vertical direction. When both the thinning reading method and the addition for the pixels can be realized in a horizontal direction as well, the frame rate can be further increased. Here, let us consider the case where both the thinning reading method and the addition for the pixels are realized in the horizontal direction.

A method of carrying out the addition for the pixels in a digital signal processing portion after information from all the pixel columns is horizontally outputted is expected as a method of realizing both the thinning reading method and the addition for the pixels in the horizontal direction. With this method, however, an amount of information horizontally outputted is not reduced. Therefore, the frame rate can be enhanced only for an increase in frame rate through the addition for the pixels in the vertical direction, and it may be impossible to sufficiently enhance the frame rate.

The present invention has been made in order to solve the problem described above, and it is therefore desirable to provide a solid-state image pickup device in which addition for pixels in a horizontal direction is realized in column ADC, thereby making it possible to reduce an amount of information horizontally outputted, a signal processing method for the same, and an image pickup apparatus using the same.

In order to attain the desire described above, according to an embodiment of the present invention, there is provided a solid-state image pickup device including: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation for adding 1 to a least significant digit with one clock period based on the time information outputted from corresponding one of the comparators, for outputting the resulting count value as a digital signal corresponding to the size of the corresponding one of the analog signals; and a control portion for carrying out control in such a way that in a phase of an addition mode, the two comparators and the two counters corresponding to the two pixel columns, respectively, are set as a unit, 1 is added to a second digit of one counter of the two counters when both the comparison results from the two comparators has a first logic, 1 is added to a first digit of the one counter when one of the comparison results from the two comparators has the first logic, and 1 is added to none of the first digit and the second digit of the one counter when both the comparison results from the two comparators has a second logic.

Also, the solid-state image pickup device having the configuration described above is used as an image pickup element (image pickup device) in a camera system such as a digital still camera or a video camera, or an electronic apparatus having an image pickup function such as a mobile phone.

In the solid-state image pickup device having the configuration described above, or an image pickup apparatus using the solid-state image pickup device, 1 is added to the second digit of the one counter of the two counters when both the comparison results from the two comparators have the first logic (either an "H" level or an "L" level). That is to say, 1 is counted with one clock period synchronously with a clock signal. As a result, the addition for the two pixels in the horizontal direction can be carried out within a column processing portion. On the other hand, 1 is added to none of the first digit and the second digit of the one counter of the two counters when both the comparison results from the two comparators have the second logic.

According to another embodiment of the present invention, there is provided a solid-state image pickup device including: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation for adding 1 to a least significant digit with one clock period based on the time information outputted from corresponding one of the comparators, for outputting the resulting count value as a digital signal corresponding to the size of the corresponding one of the analog signals; and a control portion for controlling whether or not when three or more comparators and three or more counters corresponding to three or more pixel columns, respectively, are set as a unit in a phase of an addition mode, 1 is added to each of first to third digits of one counter of the three or more counters based on the comparison results from the three or more comparators, and values of the first digit and the second digit of the one counter of the three or more counters.

According to still another embodiment of the present invention, there is provided a solid-state image pickup device including: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation for adding 1 to a least significant digit with one half clock period based on the time information outputted from corresponding one of the comparators, for outputting the resulting count value as a digital signal corresponding to the size of the corresponding one of the analog signals; and a control portion for carrying out control in such a way that in a phase of an addition mode, the two comparators and the two counters corresponding to the two pixel columns, respectively, are set as a unit, 1 is added to a second digit of one counter of the two counters every one half clock period when both the comparison results from the two comparators have a first logic, 1 is added to a first digit of the one counter every one clock period when one of the comparison results from the two comparators has the first logic, and 1 is not added to the second digit of the one counter when both the comparison results from the two comparators have a second logic.

According to yet another embodiment of the present invention, there is provided a solid-state image pickup device including: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation based on the time information outputted from corresponding one of the two comparators, for outputting the resulting count value as a digital signal corresponding to the size of the corresponding one of the analog signals; and a control portion for carrying out control in such a way that in a phase of an addition mode, the two comparators and the two counters corresponding to the two pixel columns, respectively, are set as a unit, a count portion corresponding to a first digit of one counter of the two counters is caused to carry out counting with one half clock period when both the comparison results from the two comparators have a first logic, the count portion corresponding to the first digit of the one counter of the two counters is caused to carry out counting with one clock period when one of the comparison results from the two comparators has the first logic, and the count portion corresponding to the first digit of the one counter of the two counters is caused to stop the counting when both the comparison results from the two comparators have a second logic.

According to a further embodiment of the present invention, there is provided a signal processing method for a solid-state image pickup device including: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; and counters each of which serves to carry out a counting operation for adding 1 to a least significant digit with one clock period based on the time information outputted from corresponding one of the comparators, for outputting the resulting count value as a digital signal corresponding to the size of the corresponding one of the analog signals. In the signal processing method, in a phase of an addition mode, the two comparators and the two counters corresponding to the two pixel columns, respectively, are set as a unit, 1 is added to a second digit of one counter of the two counters when both the comparison results from the two comparators has a first logic, 1 is added to a first digit of the count value of the one counter when one of the comparison results from the two comparators has the first logic, and 1 is added to none of the first digit and the second digit of the count value of the one counter when both the comparison results from the two comparators has a second logic.

When both the comparison results from the two comparators have the first logic (either an "H" level or an "L" level), 1 is added to the second digit of the one counter of the two counters. That is to say, 1 is counted with one clock period synchronously with a clock signal. As a result, the addition for the two pixels in the horizontal direction can be carried out within a column processing portion. On the other hand, when both the comparison results from the two comparators have the second logic, 1 is added to none of the first digit and the second digit of the one counter of the two counters.

According to an even further embodiment of the present invention, there is provided a signal processing method for a solid-state image pickup device including: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; and counters each of which serves to carry out a counting operation for adding 1 to a least significant digit with one clock period based on the time information outputted from corresponding one of the comparators, for outputting the resulting count value as a digital signal corresponding to the size of the corresponding one of the analog signals. In the signal processing method, it is controlled whether or not when in a phase of an addition mode, the three or more comparators and the three or more counters corresponding to three or more pixel columns, respectively, are set as a unit, 1 is added to each of first to third digits of one counter of the three or more counters based on the comparison results from the three or more comparators, and values of the first digit and the second digit of the one counter of the three or more counters.

According to a still further embodiment of the present invention, there is provided a signal processing method for a solid-state image pickup device including comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; and counters each of which serves to carry out a counting operation for adding 1 to a least significant digit with one half clock period based on the time information outputted from corresponding one of the comparators, for outputting the resulting count value as a digital signal corresponding to the size of the corresponding one of the analog signals. In the signal processing method, in a phase of an addition mode, the two comparators and the two counters corresponding to the two pixel columns, respectively, are set as a unit, 1 is added to a second digit of one counter of the two counters every one half clock period when both the comparison results from the two comparators have a first logic, 1 is added to a first digit of the one counter of the two counters every one clock period when one of the comparison results from the two comparators has the first logic, and 1 is not added to a second digit of the one counter when both the comparison results from the two comparators have a second logic.

According to a yet further embodiment of the present invention, there is provided a signal processing method for a solid-state image pickup device including: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; and counters each of which serves to carry out a counting operation for adding 1 to a least significant digit with one half clock period based on the time information outputted from corresponding one of the comparators, for outputting the resulting count value as a digital signal corresponding to the size of the corresponding one of the analog signals. In the signal processing method, in a phase of an addition mode, the two comparators and the two counters corresponding to the two pixel columns, respectively, are set as a unit, a count portion corresponding to a first digit of one counter of the two counters is caused to carry out counting with one half clock period when both the comparison results from the two comparators have a first logic, the count portion corresponding to the first digit of the one counter of the two counters is caused to carry out counting with one clock period when one of the comparison results from the two comparators has the first logic, and the count portion corresponding to the first digit of the one counter of the two counters is caused to stop the counting when both the comparison results from the two comparators have a second logic.

According to another embodiment of the present invention, there is provided an image pickup apparatus including: a solid-state image pickup device; and an optical system for imaging an incident light on an imaging area of the solid-state image pickup device. The solid-state image pickup device includes: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation for adding 1 to a least significant digit with one clock period based on the time information outputted from corresponding one of the comparators, for outputting the resulting count value as a digital signal corresponding to the size of the corresponding one of the analog signals; and a control portion for carrying out control in such a way that in a phase of an addition mode, the two comparators and the two counters corresponding to the two pixel columns, respectively, are set as a unit, 1 is added to a second digit of one counter of the two counters when both the comparison results from the two comparators has a first logic, 1 is added to a first digit of the one counter when one of the comparison results from the two comparators has the first logic, and 1 is added to none of the first digit and the second digit of the one counter when both the comparison results from the two comparators has a second logic.

According to still another embodiment of the present invention, there is provided an image pickup apparatus including: a solid-state image pickup device; and an optical system for imaging an incident light on an imaging area of the solid-state image pickup device. The solid-state image pickup device includes: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation for adding 1 to a least significant digit with one clock period based on the time information outputted from corresponding one of the comparators, for outputting the resulting count value as a digital signal corresponding to the size of the corresponding one of the analog signals; and a control portion for controlling whether or not when three or more comparators and three or more counters corresponding to three or more pixel columns, respectively, are set as a unit in a phase of an addition mode, 1 is added to each of first to third digits of one counter of the three or more counters based on the comparison results from the three or more comparators, and values of the first digit and the second digit of the one counter of the three or more counters.

According to yet another embodiment of the present invention, there is provided an image pickup apparatus including: a solid-state image pickup device; and an optical system for imaging an incident light on an imaging area of the solid-state image pickup device. The solid-state image pickup device includes: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation for adding 1 to a least significant digit with one half clock period based on the time information outputted from corresponding one of the comparators, for outputting the resulting count value as a digital signal corresponding to the size of the corresponding one of the analog signals; and a control portion for carrying out control in such a way that in a phase of an addition mode, the two comparators and the two counters corresponding to the two pixel columns, respectively, are set as a unit, 1 is added to a second digit of one counter of the two counters every one half clock period when both the comparison results from the two comparators have a first logic, 1 is added to a first digit of the one counter every one clock period when one of the comparison results from the two comparators has the first logic, and 1 is not added to the second digit of the one counter when both the comparison results from the two comparators have a second logic.

According to a further embodiment of the present invention, there is provided an image pickup apparatus including: a solid-state image pickup device; and an optical system for imaging an incident light on an imaging area of the solid-state image pickup device. The solid-state image pickup device includes: comparators provided so as to correspond to pixel columns, respectively, for a pixel array portion having unit pixels, including respective photo-electric conversion elements, disposed in a matrix, each of the comparators serving to compare an analog signal outputted from corresponding one of the unit pixels through corresponding one of vertical signal lines with a ramp-like reference signal, for outputting a comparison result containing time information corresponding to a size of corresponding one of the analog signals; counters each of which serves to carry out a counting operation based on the time information outputted from corresponding one of the two comparators, for outputting the resulting count value as a digital signal corresponding to the size of the corresponding one of the analog signals; and a control portion for carrying out control in such a way that in a phase of an addition mode, the two comparators and the two counters corresponding to the two pixel columns, respectively, are set as a unit, a count portion corresponding to a first digit of one counter of the two counters is caused to carry out counting with one half clock period when both the comparison results from the two comparators have a first logic, the count portion corresponding to the first digit of one counter of the two counters is caused to carry out the counting with one clock period when one of the comparison results from the two comparators has the first logic, and the count portion corresponding to the first digit of the one counter of the two counters is caused to stop the counting when both the comparison results from the two comparators have a second logic.

According to the embodiments of the present invention, the addition for the two pixels in the horizontal direction can be carried out within the column processing portion, thereby making it possible to reduce the amount of information horizontally outputted to one half while the sensitivity is maintained. As a result, it is possible to realize the enhancement of the frame rate, and the reduction of the power consumption.

BRIEF DESCRIPTION OF THE DRAWINGS

FIGS. 10A to 10C are respectively diagrams showing relationships between comparison results Vco(i−1), Vco(i) and Vco(i+1) from three comparators, and values R1 and R2 of count portions of first and second digits of a counter, and control for the count portions of the first to third digits;

Figure 11:
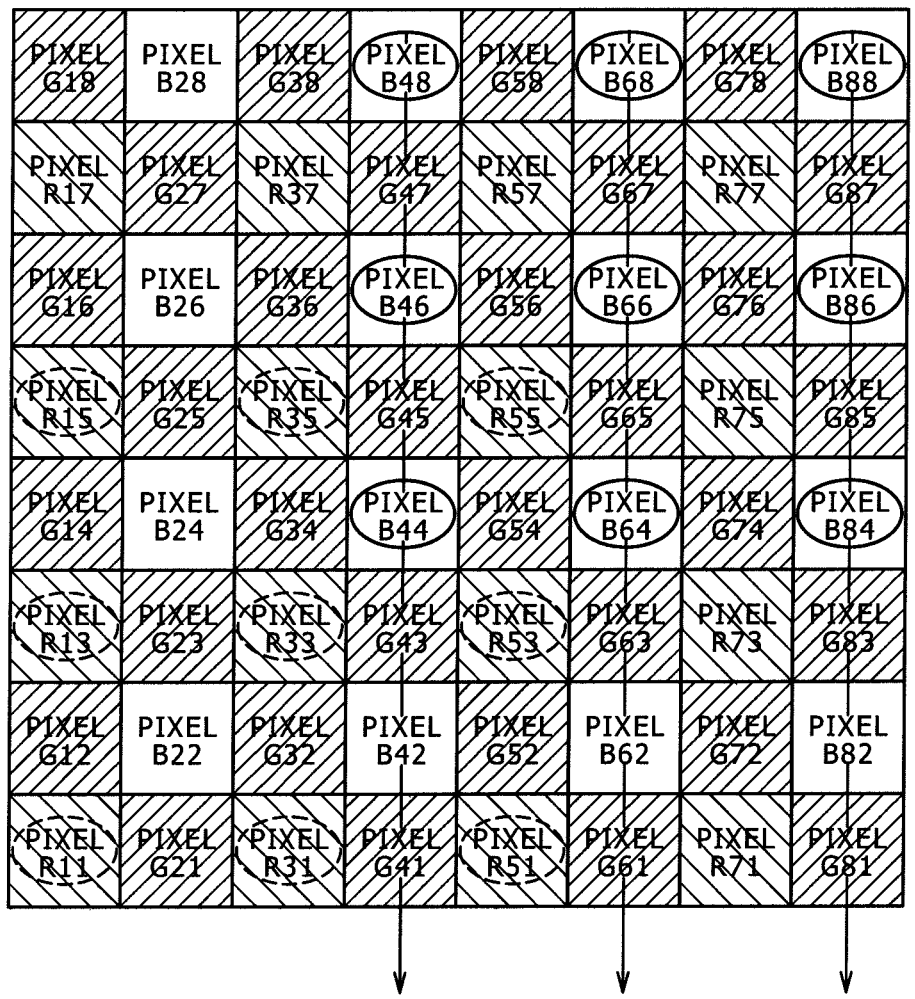
Figure 12:
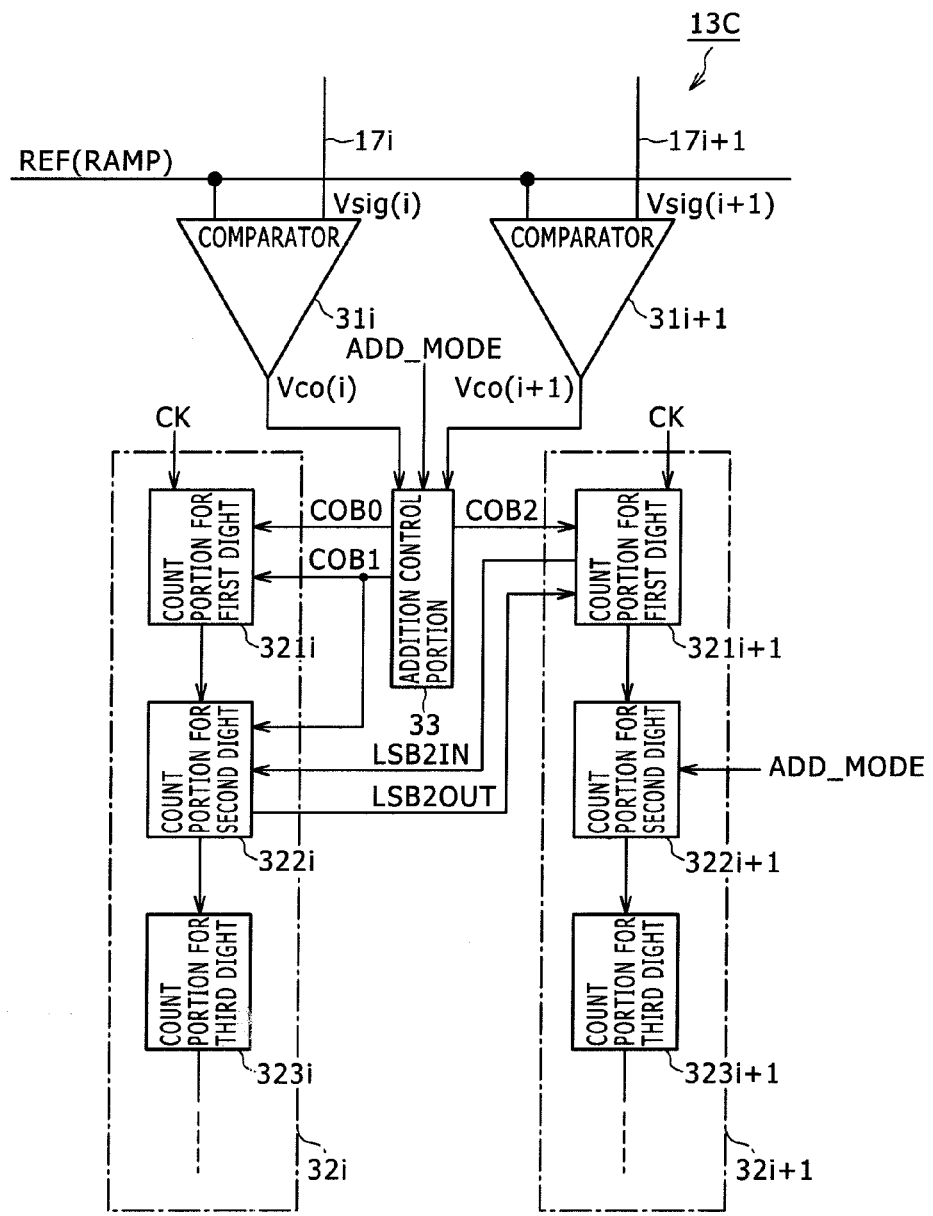
Figure 13:
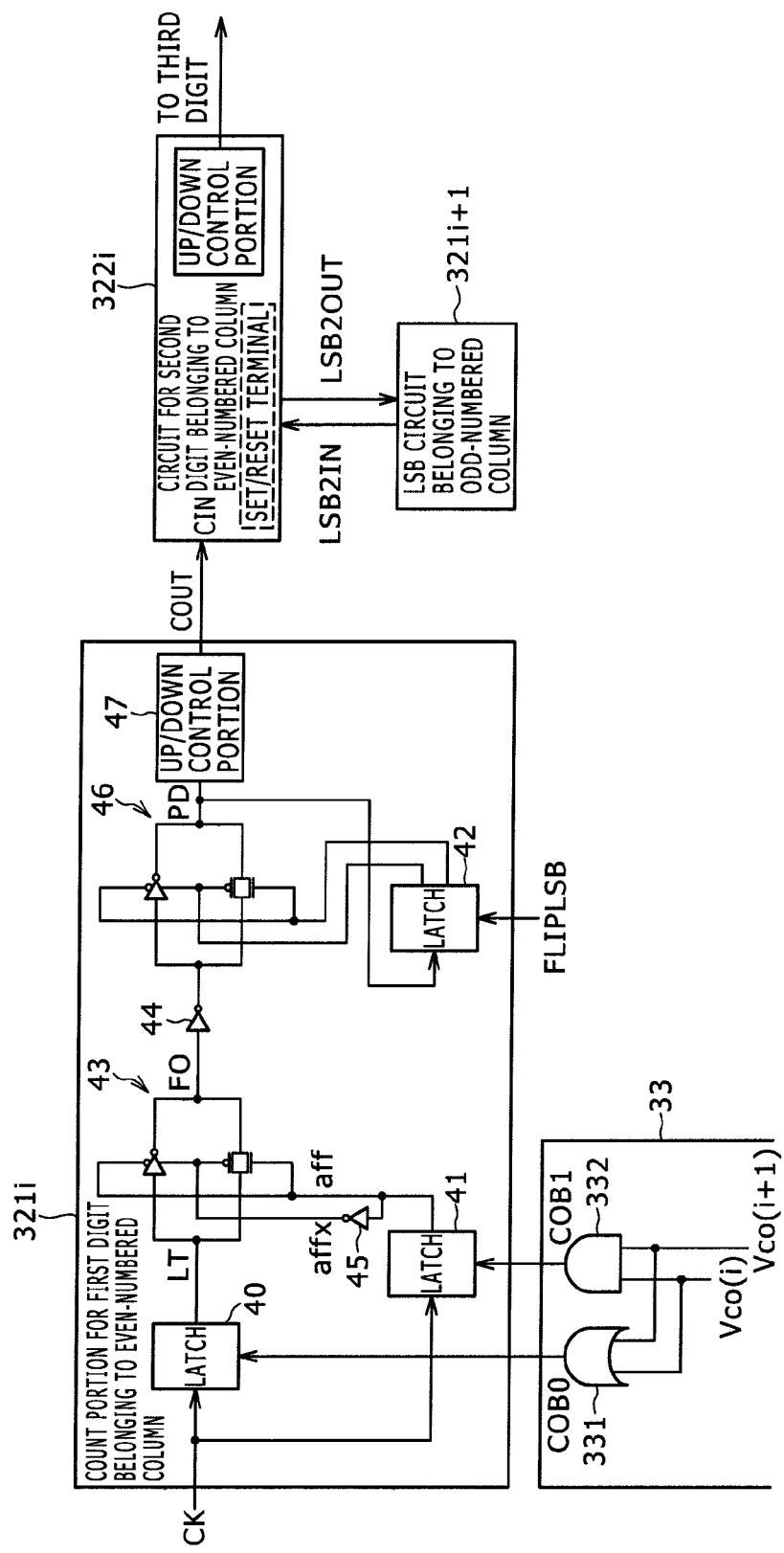
Figure 14A:
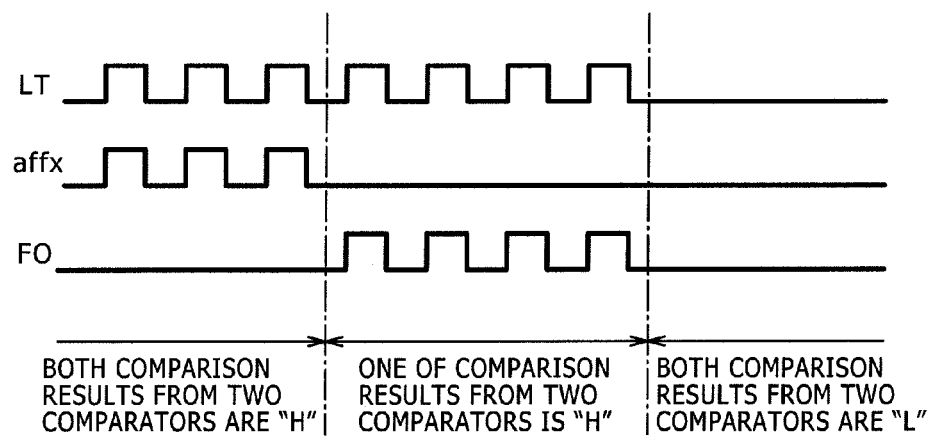
Figure 14B:
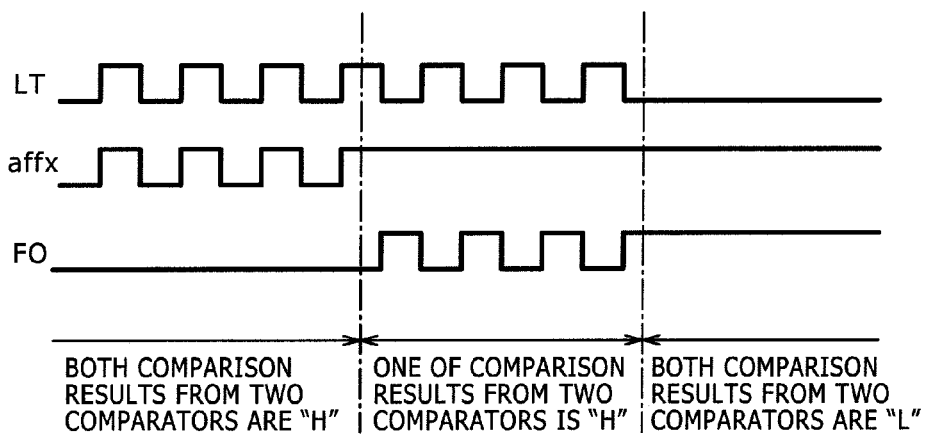
Figure 15:
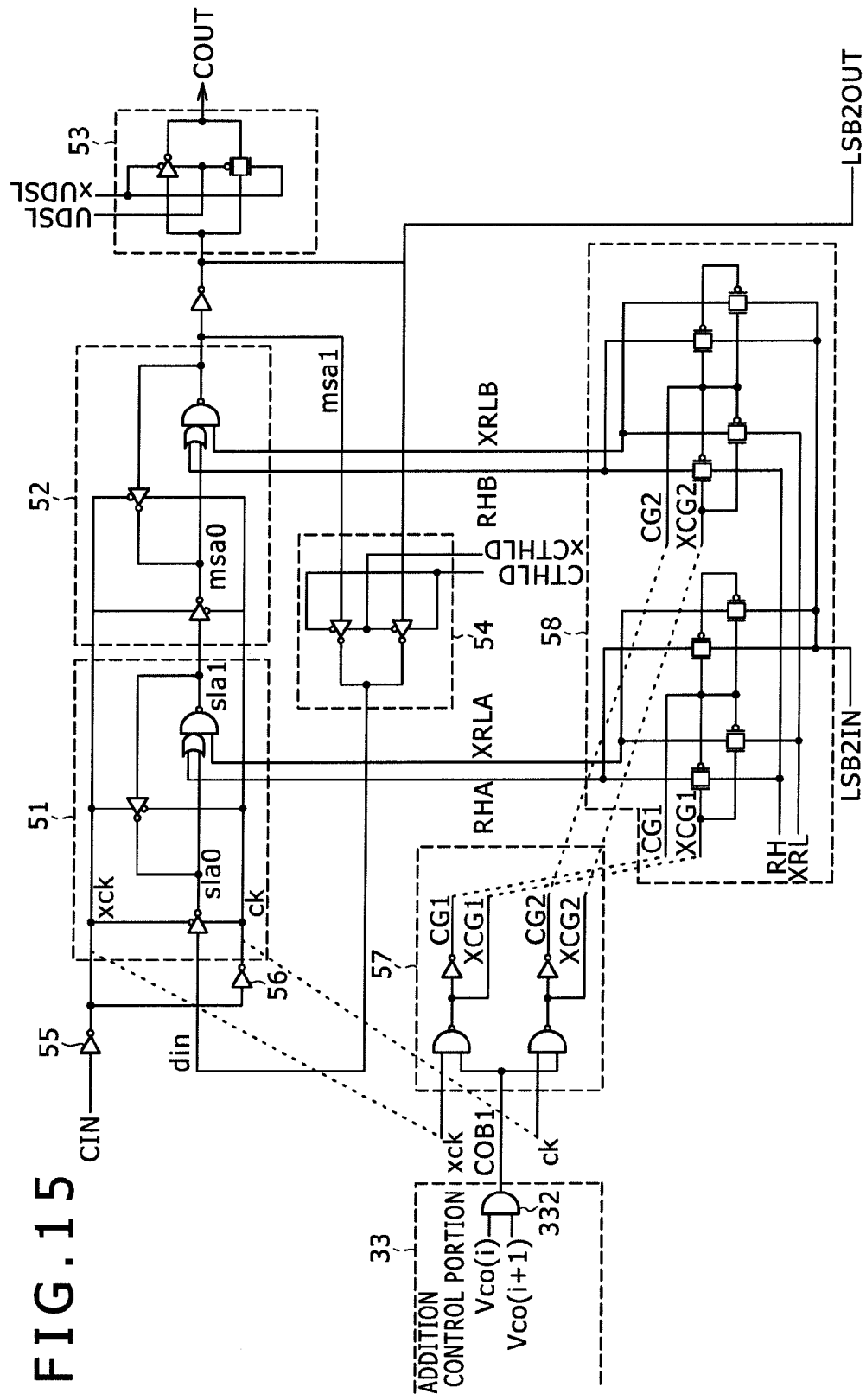
Figure 16:
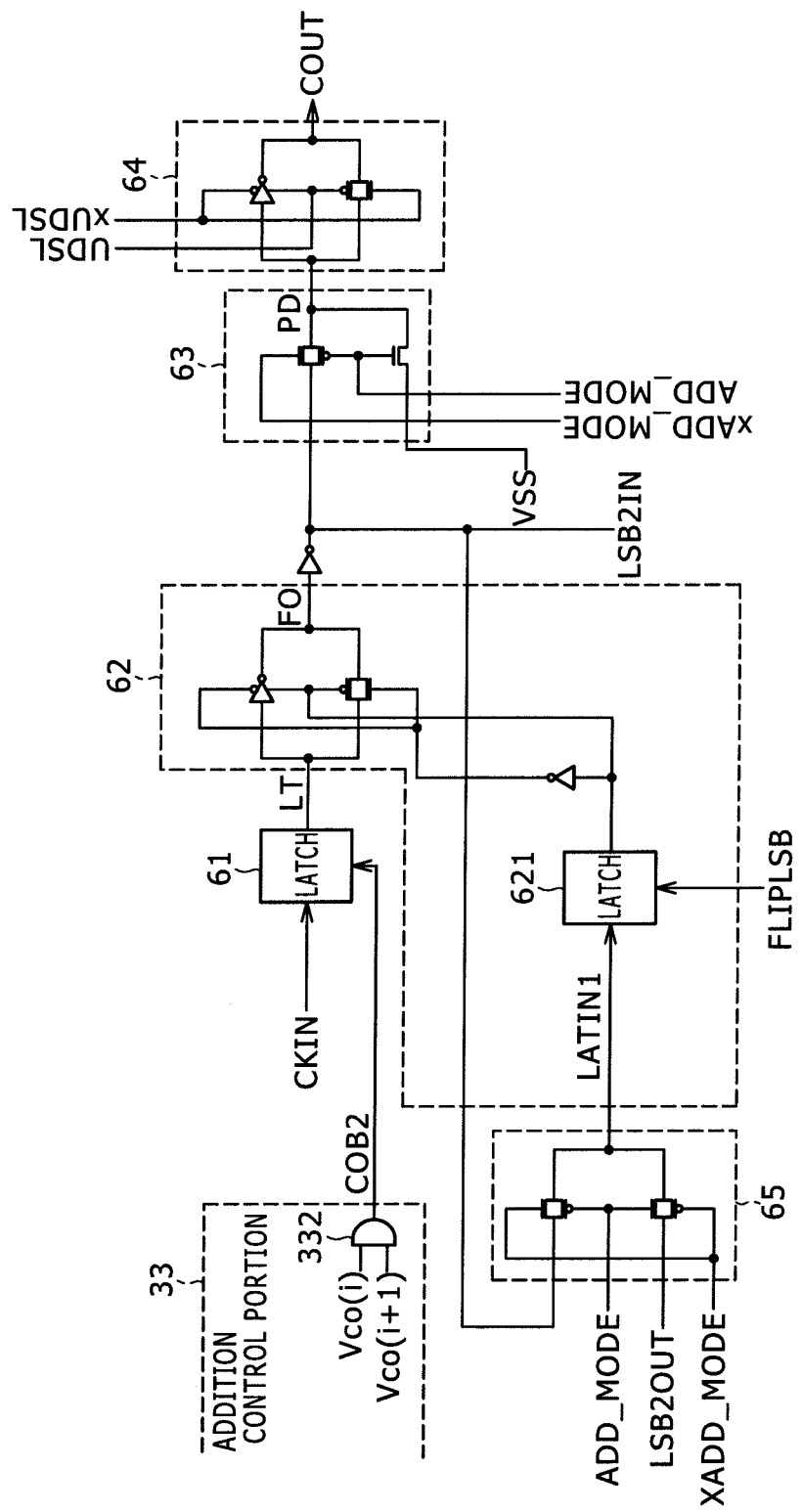
Figure 17:
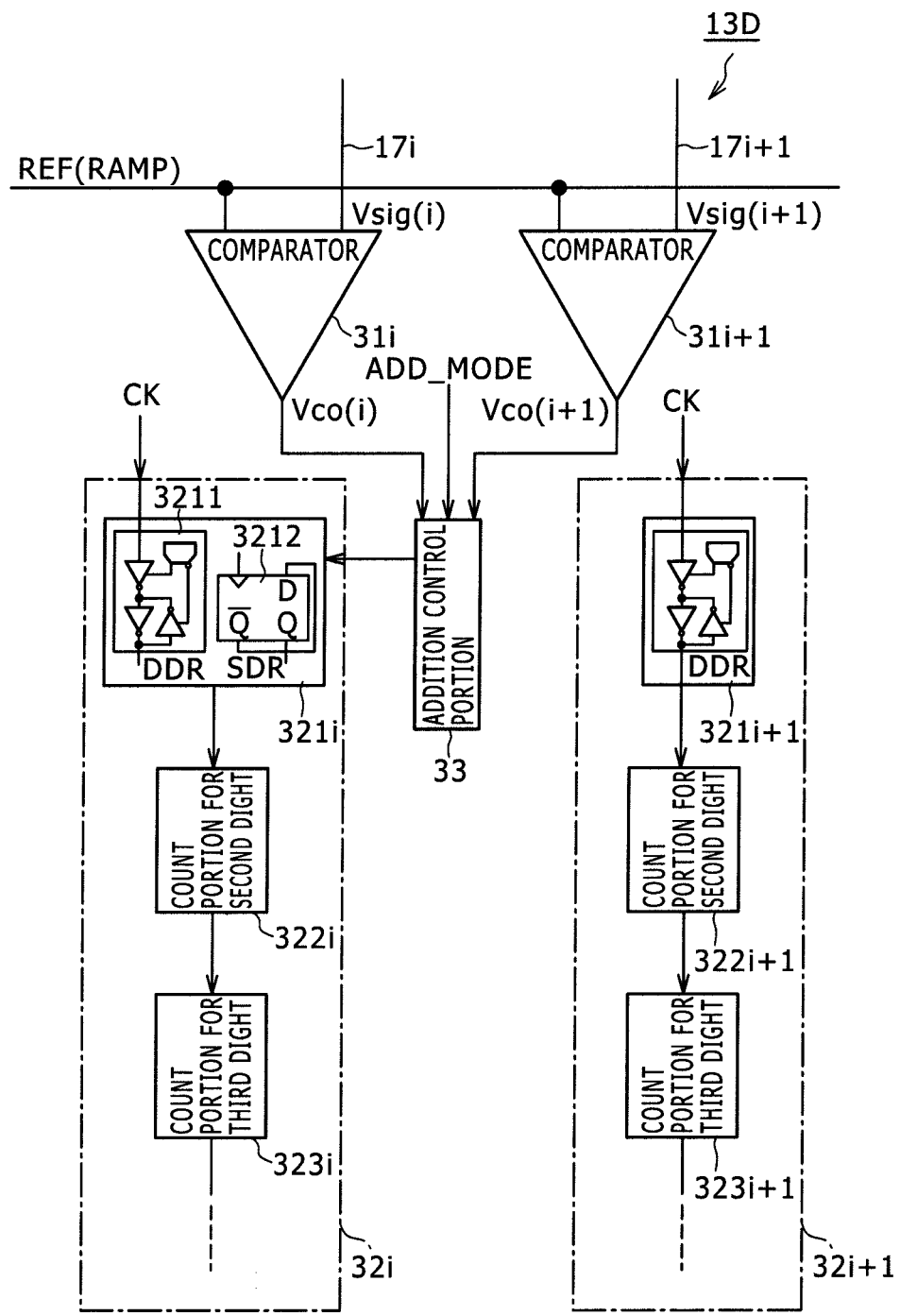
Figure 18:
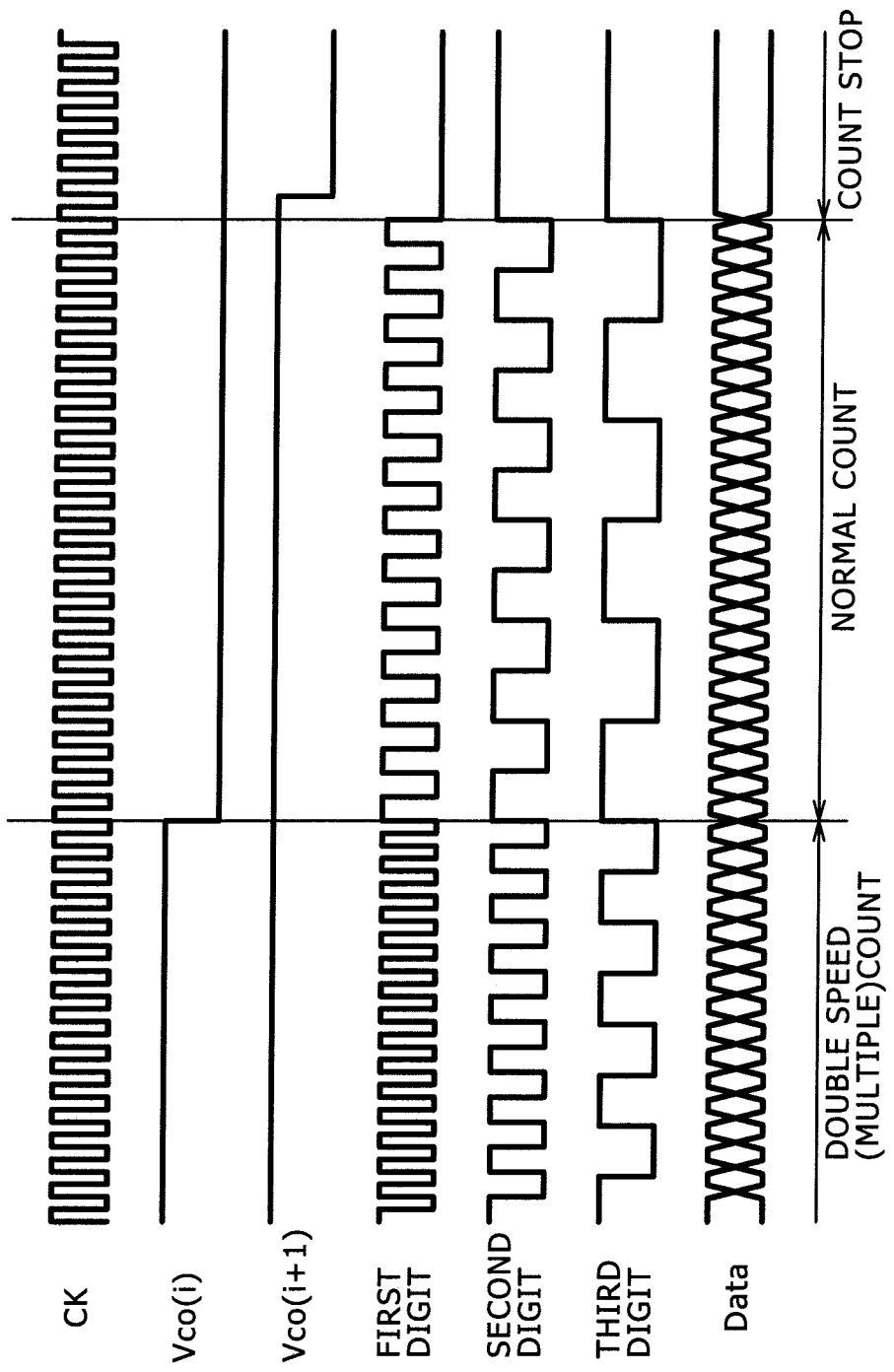
Figure 19:
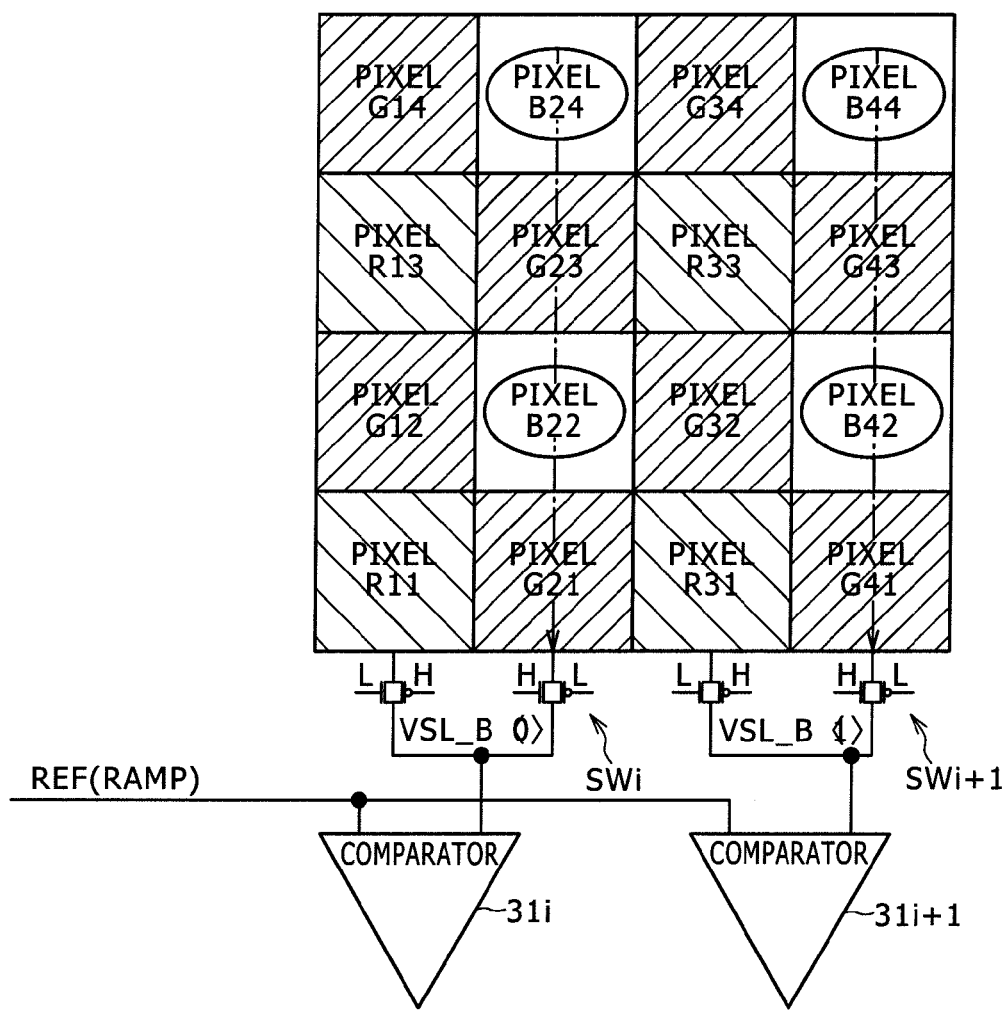
Figure 20:
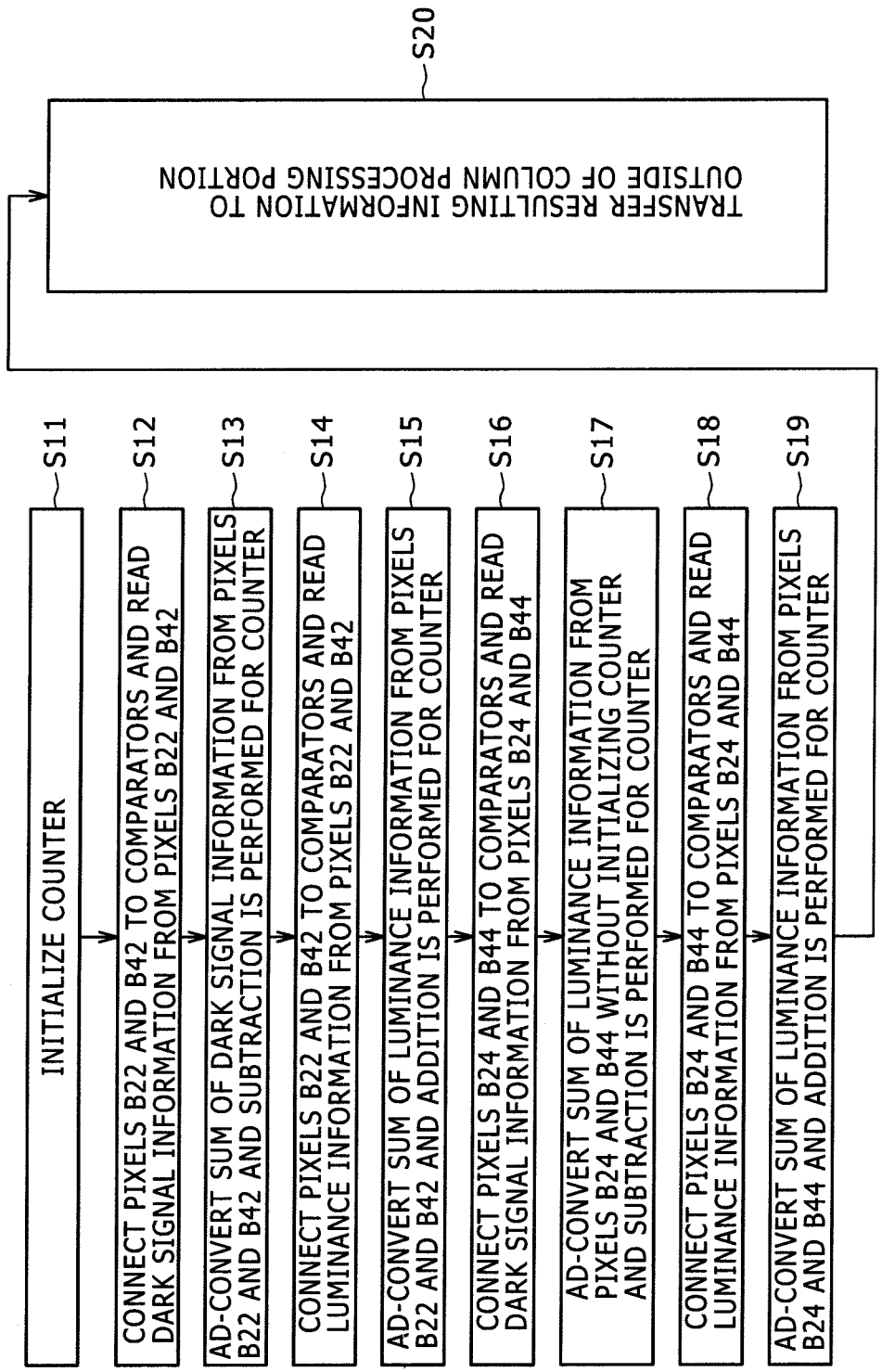
Figure 21:
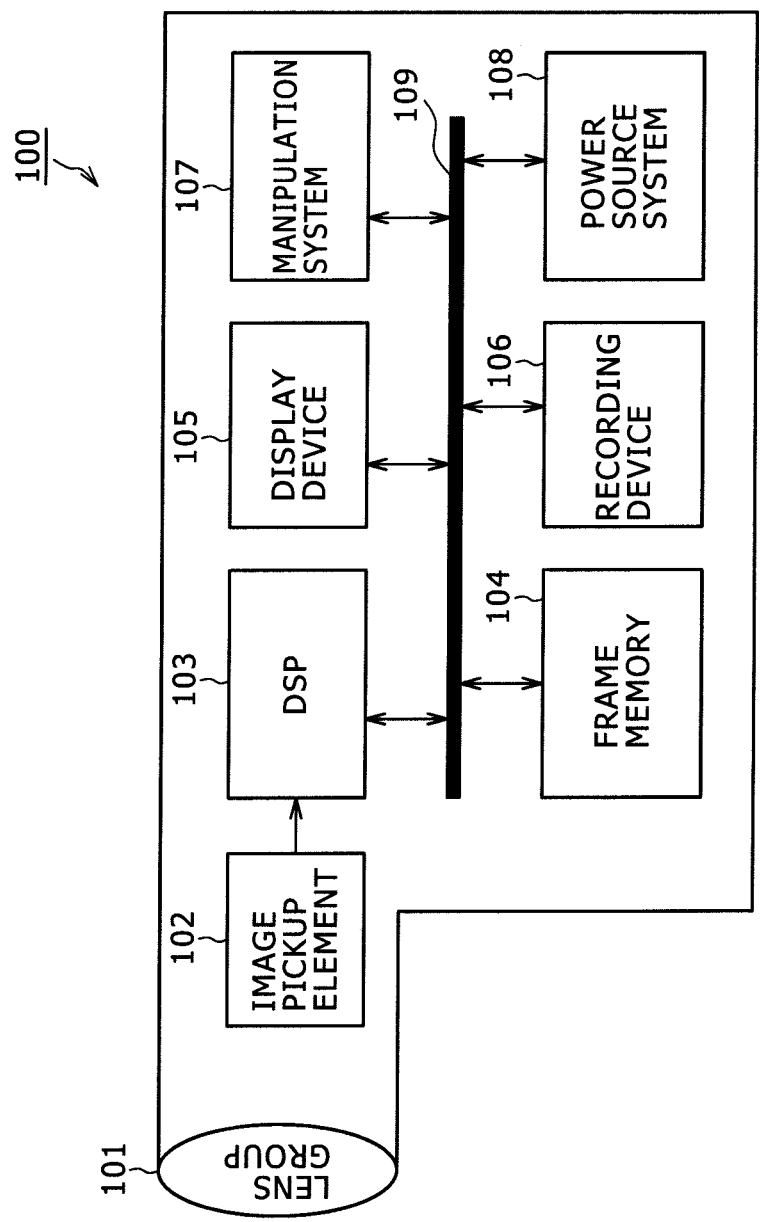

FIG. 11 is a diagram showing an arrangement of color filters used in an explanation of the operation of the column processing portion in the image pickup device according to Embodiment 2 of the present invention;

FIG. 12 is a block diagram showing a configuration of a column processing portion in an image pickup device according to Embodiment 3 of the present invention;

FIG. 13 is a circuit diagram, partly in block, showing a concrete circuit configuration of an LSB count portion belonging to a pixel column i (an LSB circuit belonging to an even-numbered column);

FIGS. 14A and 14B are respectively timing waveforms each showing a situation of changes in potential at a node LT, inverting control pulse affx, and potential at a node FO;

FIG. 15 is a circuit diagram showing a circuit configuration of a count portion of a second digit belonging to a pixel column i;

FIG. 16 is a circuit diagram showing a concrete circuit configuration of an LSB count portion belonging to a pixel column (i+1) (an LSB circuit belonging to an odd-numbered column);

FIG. 17 is a block diagram showing a configuration of a column processing portion in an image pickup device according to Embodiment 4 of the present invention;

FIG. 18 is a timing chart showing a timing relationship of control in the column processing portion in the image pickup device according to Embodiment 4 of the present invention;

FIG. 19 is a diagram, partly in circuit, showing a relationship between comparators and pixels when addition for (2×2) pixels in horizontal and vertical directions is carried out;

FIG. 20 is a flow chart explaining a processing procedure when addition for pixels in both horizontal and vertical directions is carried out; and FIG. 21 is a block diagram showing a configuration of an image pickup apparatus according to an embodiment of the present invention.

DETAILED DESCRIPTION OF THE PREFERRED EMBODIMENTS

Preferred embodiments of the present invention will be described in detail hereinafter with reference to the accompanying drawings.
[System Configuration]

Figure 1:
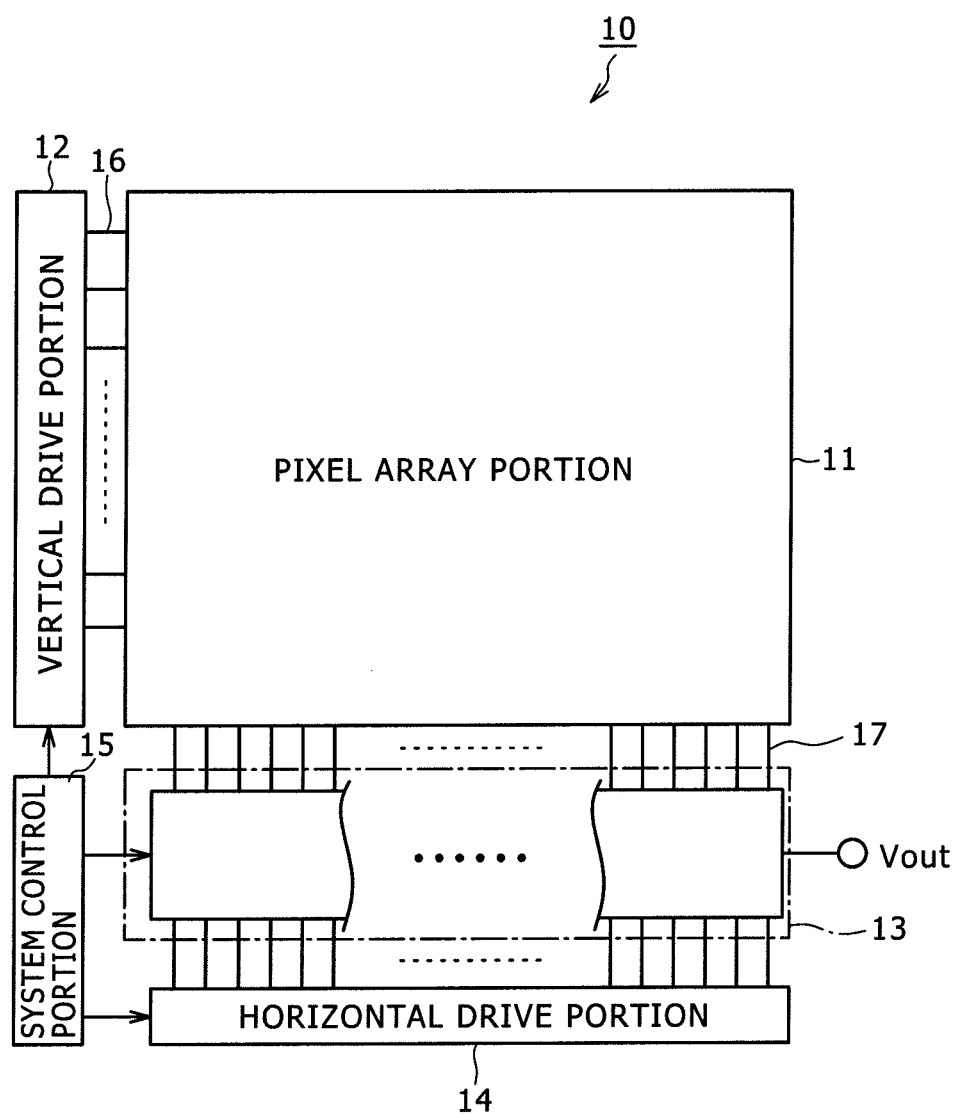
FIG. 1 is a system configuration diagram showing an outline of a configuration of a CMOS image sensor to which an embodiment of the present invention is applied.

FIG. 1 is a system configuration diagram showing a configuration of a solid-state image pickup device, for example, a CMOS image sensor to which an embodiment of the present invention is applied.

As shown in FIG. 1, the CMOS image sensor 10 to which an embodiment of the present invention is applied includes a pixel array portion 11 formed on a semiconductor substrate (chip) (not shown), and peripheral circuit portions integrated on the same semiconductor substrate as that of the pixel array portion 11. For example, a vertical drive portion 12, a column processing portion 13, a horizontal drive portion 14, and a system control portion 15 are provided as the peripheral circuit portions.

Unit pixels (hereinafter referred simply to as "pixels" in some cases) each including a photoelectric conversion element for photoelectrically converting a visible light made incident thereto into an amount of electric charges corresponding to a light quantity of the visible light are two-dimensionally disposed in a matrix in the pixel array portion 11. A concrete configuration of the unit pixel will be described later.

A pixel drive line 16 is formed along a horizontal direction (a disposition direction of the pixels belonging to a pixel row) of FIG. 1 every row, and a vertical signal line 17 is formed in a vertical direction (a disposition direction of the pixels belonging to a pixel column) of FIG. 1 every column for matrix-like pixel disposition in the pixel array portion 11. Although one pixel drive line 16 is shown in FIG. 1 every row, the present invention is by no means limited thereto. One ends of the pixel drive lines 16 are connected to output terminals corresponding to the rows of the vertical drive portion 12, respectively.

The vertical drive portion 12 is composed of a shift register, an address decoder, and the like. In this case, although a concrete configuration is omitted here in illustration thereof, the vertical drive portion 12 includes a read scanning system, and a sweep scanning system. The read scanning system successively selects and scans the unit pixels from which pixel signals are intended to be read out, respectively, in rows.

On the other hand, the sweep scanning system carries out sweep scanning for sweeping (resetting) unnecessary electric charges from photoelectric conversion elements of the unit pixels of a read row earlier than the read scanning by a time of a shutter speed for the read row for which the read scanning is carried out by the read scanning system. A so-called electronic shutter operation is carried out by sweeping (resetting) the unnecessary electric charges by the sweep scanning system. Here, the electronic shutter operation means an operation for discarding the photoelectric charges from the photoelectric conversion elements, and newly starting exposure (starting to accumulate the photoelectric charges).

A signal read out in the read operation by the read scanning system corresponds to a quantity of light which is made incident either in the immediately preceding read operation, or in and after the electronic shutter operation. Also, a time period from either a timing at reading by the immediately preceding read operation, or a timing at sweeping by the electronic shutter operation to a timing at reading by the present read operation is a time period for accumulation of the photoelectric charges in the unit pixel (a time period for exposure).

The signals which are outputted from the unit pixels belonging to the pixel row selected and scanned by the vertical drive operation 12 are supplied to the column processing portion 13 through the respective vertical signal lines 17. The column processing portion 13 is a signal reading circuit portion having an AD conversion function of reading out digital signals while the analog signal outputted from the pixels 20 belonging to the selected row are converted into the digital signals every pixel column of the pixel array portion 11. A detailed circuit configuration and a circuit operation of the column processing portion 13 will be described later.

The horizontal drive portion 14 is composed of a shift register, an address decoder, and the like, and selects the column processing portions 13 in order. The pixel signals digitized in the column processing portions 13 are outputted in order through the selection and scanning by the horizontal drive portion 14.

The system control portion 15 is composed of a timing generator for generating various kinds of timing signals, and the like. Also, the system control portion 15 carries out drive and control for the vertical drive portion 12, the column processing portion 13, the horizontal drive portion 14, and the like in accordance with the various kinds of timing signals generated in the timing generator.

(Circuit Configuration of Unit Pixel)

Figure 2:
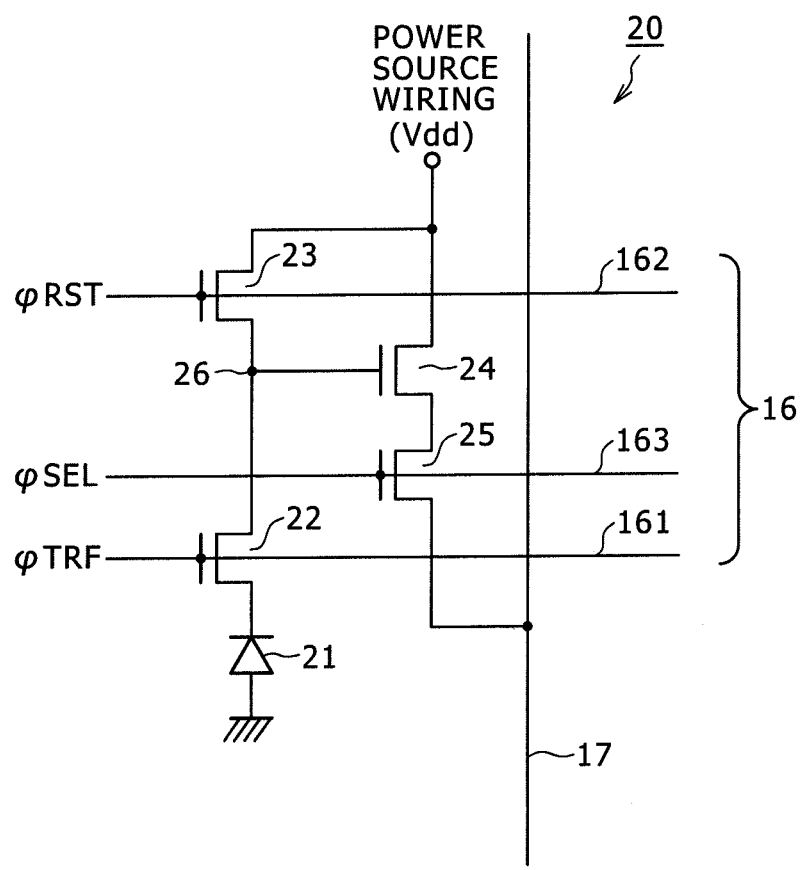
FIG. 2 is a circuit diagram showing a circuit configuration of a unit pixel in the CMOS image sensor shown in FIG. 1.

FIG. 2 is a circuit diagram showing a circuit configuration of the unit pixel 20. As shown in FIG. 2, the unit pixel 20 includes a photoelectric conversion element, a photodiode 21, and four transistors of, for example, a transfer transistor 22, a reset transistor 23, an amplification transistor 24, and a selection transistor 25.

In this case, for example, N-channel MOS transistors are used as the four transistors 22 to 25, respectively. However, a combination of conductivity types of the transfer transistor 22, the reset transistor 23, the amplification transistor 24, and the selection transistor 25 exemplified here is merely an example, and thus the present invention is by no means limited thereto.

For the unit pixels 20, for example, three drive wirings of a transfer line 161, a reset line 162, and a selection line 163 are provided as a pixel drive line 16 commonly to the pixels belonging to the same pixel row. One ends of the transfer line 161, the reset line 162, and the selection line 163 are connected to output terminals corresponding one of the pixel rows of the vertical drive portion 12 in pixel rows.

An anode electrode of the photodiode 21 is connected to a negative side power source (for example, the ground). Also, the photodiode 21 photoelectrically converts a light received thereon into photoelectric charges (photoelectrons in this case) having a charge amount corresponding to a light quality of the received light. On the other hand, a cathode electrode of the photodiode 21 is electrically connected to a gate electrode of the amplification transistor 24 through the transfer transistor 22. A node 26 electrically connected to the gate electrode of the amplification transistor 24 is called a Floating Diffusion (FD) portion.

The transfer transistor 22 is connected between the cathode electrode of the photodiode 21, and the FD portion 26. A transfer pulse φTRF in which a high level (for example, a Vdd level) is active (hereinafter described as "high active") is applied to the gate electrode of the transfer transistor 22 through corresponding one of the transfer lines 161. As a result, the transfer transistor 22 is turned ON, thereby transferring the photoelectric charges obtained through the photoelectric conversion in the photodiode 21 to the FD portion 26.

A drain electrode of the reset transistor 23 is connected to the pixel power source Vdd, and a source electrode thereof is connected to the FD portion 26. A high active reset pulse φRST is applied to a gate electrode of the reset transistor 23 through corresponding one of the reset lines 162. As a result, the reset transistor 23 is turned ON, so that the FD portion 26 is reset by discarding the electric charges in the FD portion 26 to the pixel power source Vdd prior to the transfer of the signal electric charges from the photodiode 21 to the FD portion 26.

A gate electrode of the amplification transistor 24 is connected to the FD portion 26, and a drain electrode thereof is connected to the pixel power source Vdd. Also, the amplification transistor 24 outputs a potential at the FD portion 26 after the potential at the FD portion 26 is reset by the reset transistor 23 as a reset signal (reset level) Vreset. Moreover, the amplification transistor 24 outputs a potential at the FD portion 26 after the signal electric charges are transferred to the FD portion 26 by the transfer transistor 22 as a photo-accumulation signal (signal level) Vsig.

For example, a drain electrode of the selection transistor 25 is connected to a source electrode of the amplification transistor 24, and a source electrode thereof is connected to corresponding one of the vertical signal lines 17. A high active selection pulse φSEL is applied to a gate electrode of the selection transistor 25 through corresponding one of the selection lines 163. As a result, the selection transistor 25 is turned ON, so that the unit pixel 20 is set in a selection state, and the selection transistor 25 relays the signal outputted from the amplification transistor 24 to corresponding one of the vertical signal lines 17.

It should be noted that a circuit configuration in which the selection transistor 25 is connected between the pixel power source Vdd and the drain electrode of the amplification transistor 24 can also be adopted for the selection transistor 25.

In addition, the unit pixel 20 is by no means limited to one having the pixel configuration composed of the four transistors configured as described above. For example, a pixel configuration composed of three transistors one of which is used both as the amplification transistor 24 and the selection transistor 25 may also be adopted. Thus, a configuration of the pixel circuit is no object.

In the CMOS image sensor 10 having the configuration as described above, the features of the present invention is the circuit configuration and circuit operation of the column processing portion 13 having the AD conversion function.

(Basic Configuration of Column Processing Portion Having AD Conversion Function)

A basic configuration and operation of the column processing portion 13 will now be described prior to giving a description with respect to concrete embodiments of the column processing portion 13 having the AD conversion function in the CMOS image sensor of the present invention.

Figure 3:
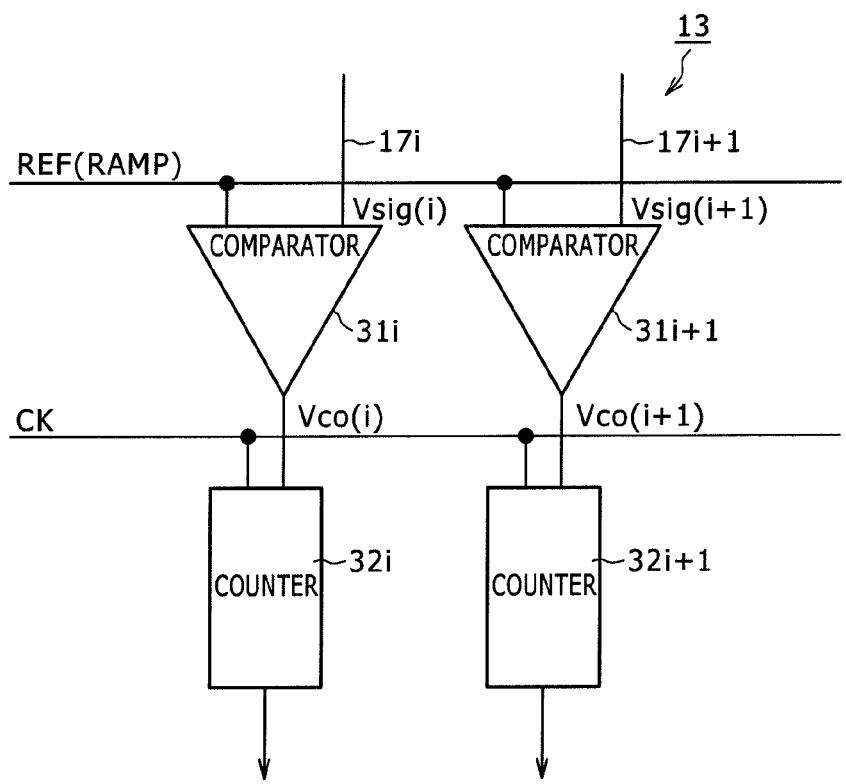
FIG. 3 is a block diagram showing a basic configuration of a column processing portion having an AD conversion function in the CMOS image sensor shown in FIG. 1.

FIG. 3 is a block diagram, partly in circuit, showing a basic configuration of the column processing portion 13 having the AD conversion function. In this case, there is shown a circuit configuration about two pixel columns of an i-th column and an (i+1)-th column. Here, since the two pixel columns i and i+1 are the pixel columns adjacent to each other, they can also be said as an odd-numbered (or an even-numbered) pixel column, and an even-numbered (or an odd-numbered) pixel column.

As shown in FIG. 3, the column processing portion 13 includes comparators 31$i$ and 31$i$+1, and counters 32$i$ and 32$i$+1 which are each provided so as to correspond to the two pixel columns i and i+1, respectively.

The comparators 31$i$ and 31$i$+1 receive analog pixel signals Vsig(i) and Vsig(i+1) inputted thereto through the vertical signal lines 17$i$ and 17$i$+1 at one input terminals thereof, respectively, and receive reference signals REF each having a RAMP waveform (ramp-like waveform) at the other input terminals thereof, respectively. The reference signal REF is supplied from a reference signal generating portion (not shown). Each of the comparators 31$i$ and 31$i$+1 compares both the input signals with each other. For example, when the pixel signals Vsig(i) and Vsig(i+1) are each lower in level than the reference signal REF, the comparators 31$i$ and 31$i$+1 output comparison results Vco(i) and Vco(i+1) each at an "H" level. On the other hand, when the pixel signals Vsig(i) and Vsig(i+1) are each higher in level than the reference signal REF, the comparators 31$i$ and 31$i$+1 output comparison results Vco(i) and Vco(i+1) each at an "L" level. Here, the comparison results Vco(i) and Vco(i+1) each at the "H" level are pulse signals having sizes (time information/pulse width), in a time axis direction, corresponding to sizes of the pixel signals Vsig(i) and Vsig(i+1), respectively.

Figure 4:
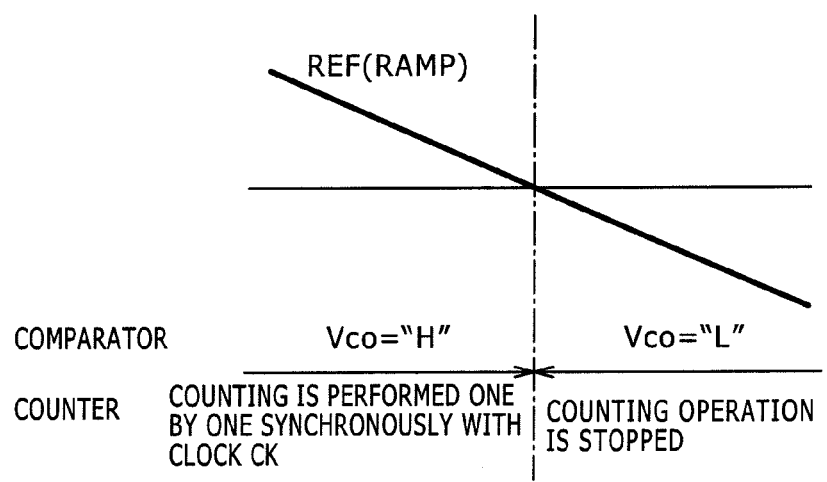
FIG. 4 is a conceptual diagram explaining an operation of the column processing portion having a basic configuration.

The counters 32*i* and 32*i*+1 carry out counting operations synchronously with a clock signal CK having a given period for a time period for which the comparison results Vco(i) and Vco(i+1) from the comparators 31*i* and 31*i*+1 are each held at the "H" level. The counters 32*i* and 32*i*+1 output count values as digital signals corresponding to the sizes of the pixel signals Vsig(i) and Vsig(i+1), respectively. As shown in FIG. 4, while the comparison results Vco(i) and Vco(i+1) are each held at the "H" level, the counter 32*i* and 32*i*+1 carry out the counting one by one synchronously with the clock signal CK. On the other hand, while the comparison results Vco(i) and Vco(i+1) are each held at the "L" level, the counter 32*i* and 32*i*+1 carry out no counting.

Hereinafter, column processing portions 13A to 13D in image pickup devices according to Embodiments 1 to 4 of the present invention will be described in detail on the basis of the basic configuration of the column processing portion 13 having the AD conversion function described above.

(Embodiment 1)

Figure 5:
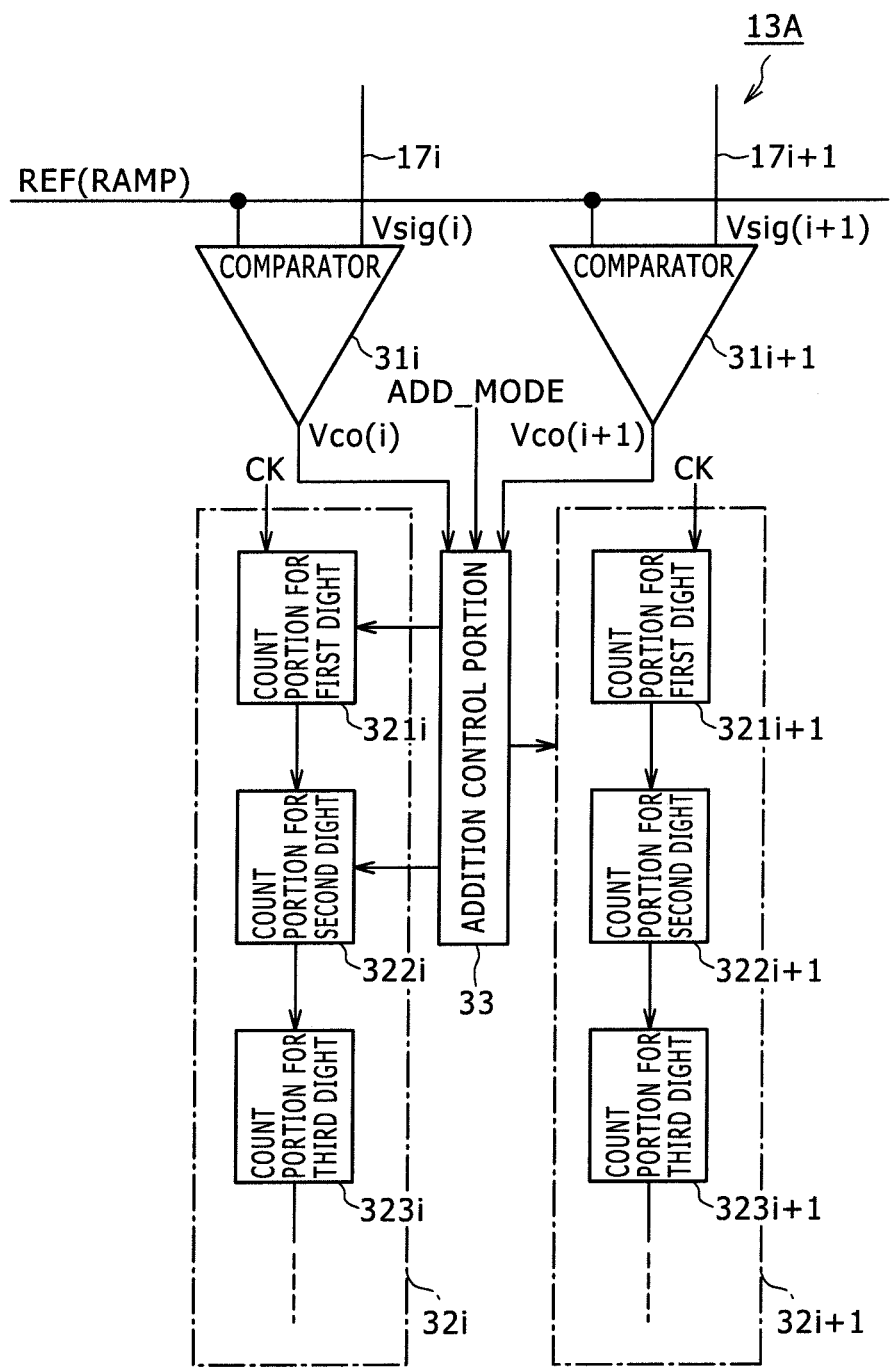
FIG. 5 is a block diagram showing a configuration of a column processing portion in an image pickup device according to Embodiment 1 of the present invention.

FIG. 5 is a block diagram, partly in circuit, showing a configuration of the column processing portion 13A in the image pickup device of Embodiment 1. In the figure, the same portions as those in FIG. 3 are designated with the same reference numerals or symbols, respectively. In this case, a circuit configuration of two pixel columns of an i-th column, and an (i+1)-th column is shown with two pixel columns as a unit.

The column processing portion 13A in the image pickup device of Embodiment 1 is identical to the column processing portion 13 described above in that the column processing portion 13A includes comparators 31*i* and 31*i*+1, and counters 32*i* and 32*i*+1 which are each provided so as to correspond to two pixel columns i and i+1, respectively. Also, a Single Data Rate (SDR) counter in which 1 is added to the least significant digit (1 count) with one period of a clock signal CK as a reference for a counting operation of a counter is used as each of the counters 32*i* and 32*i*+1. In addition, the configuration and operation of the comparators 31*i* and 31*i*+1 are also the same as those in the case of the column processing portion 13 described above.

The comparators 31*i* and 31*i*+1 compare analog pixel signals Vsig(i) and Vsig(i+1) inputted thereto through vertical signal lines 17*i* and 17*i*+1 with reference signals REF each having a RAMP waveform supplied from a reference signal generating portion (not shown), respectively. Also, for example, when the pixel signals Vsig(i) and Vsig(i+1) are each lower in level than the reference signal REF, the comparators 31*i* and 31*i*+1 output comparison results Vco(i) and Vco(i+1) each at an "H" level, respectively. On the other hand, when the pixel signals Vsig(i) and Vsig(i+1) are each higher in level than the reference signal REF, the comparators 31*i* and 31*i*+1 output comparison results Vco(i) and Vco(i+1) each at an "L" level, respectively. Here, the comparison results Vco(i) and Vco(i+1) each at the "H" level are pulse signals having sizes (pulse widths), in a time axis direction, corresponding to the sizes of the pixel signals Vsig(i) and Vsig(i+1), respectively.

The counters 32*i* and 32*i*+1 include count portions 321*i* and 321*i*+1 for a first digit (least significant digit), count portions 322*i* and 322*i*+1 for a second digit, count portions 323*i* and 323*i*+1 for a third digit, . . . , respectively.

The column processing portion 13A in Embodiment 1 includes an addition control portion 33 in addition to the comparators 31*i* and 31*i*+1, and the counters 32*i* and 32*i*+1. The addition control portion 33 becomes an operation state in response to an addition mode signal ADD_MODE which becomes an active (for example, an "H" level) state in a phase of a horizontal addition mode in which addition for pixels in a horizontal direction is carried out. Also, the addition control portion 33 controls the counting operations of the count portion 321*i* for the first digit, and the count portion 322*i* for the second digit each belonging to an i-th column based on the logic of the comparison results Vco(i) and Vco(i+1) from the comparators 31*i* and 31*i*+1, respectively.

Figure 6:
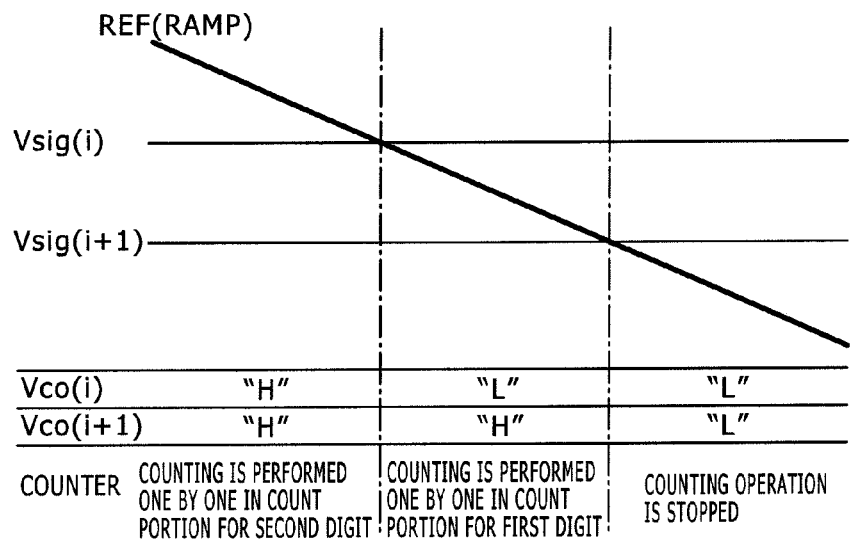
FIG. 6 is a conceptual diagram explaining an operation of the column processing portion in the image pickup device according to Embodiment 1 of the present invention.

With regard to an operation of the column processing portion 13A, let us consider the case where the comparison results Vco(i) and Vco(i+1) from the comparators 31*i* and 31*i*+1 are each at the "L" level (logic "0") as shown in FIG. 6. The case means that the addition control portion 33 stops the counting operation, of the count portion 321*i* for the first digit of the counter 32*i* belonging to the i-th column, which is synchronized with the clock signal CK, thereby inhibiting the counter 32*i* belonging to the i-th column from carrying out the counting operation.

When one of the comparison results Vco(i) and Vco(i+1) from the comparators 31*i* and 31*i*+1 is at the "H" level (logic "1"), the addition control portion 33 carries out the following control for a time period of the "H" level. That is to say, the addition control portion 33 carries out the control in such a way that the count portion 321*i* for the first digit of the counter 32*i* belonging to the i-th column is instructed to carry out counting one by one with one clock period synchronously with the clock signal CK. As a result, a digital value corresponding to the size of the pixel signal outputted from the pixel belonging to one of the pixel column belonging to the i-th row, and the pixel column belonging to the (i+1)-th row is outputted from the counter 32*i* belonging to the i-th column.

When both the potentials of the comparison results Vco(i) and Vco(i+1) from the comparators 31*i* and 31*i*+1 are at the "H" level, the addition control portion 33 carries out the following control for a time period of the "H" level. That is to say, the addition control portion 33 carries out the control in such a way that the count portion 322*i* for the second digit of the counter 32*i* belonging to the i-th column is instructed to carry out the counting one by one with one clock period synchronously with the clock signal CK. Here, instructing the count portion 322*i* for the second digit of the counter 32*i* belonging to the i-th column to carry out the counting one by one synchronously with the clock signal CK is identical in sense to instructing the count portion 321*i* for the first digit to carry out the counting two by two synchronously with the clock signal CK.

That is to say, when the count portion 321*i* for the first digit counts 2, the carry is generated and thus the current portion 321*i* for the second digit counts 1. In addition, the fact that the count portion 321*i* for the first digit counts 2 means that the two pixel signals outputted from the two pixels, belonging to the same row, in both the pixel column belonging to the i-th row, and the pixel column belonging to the (i+1)-th row, that is, the two pixels, exhibiting the same color, adjacent to each other in the horizontal direction are added to each other.

Therefore, when the potentials of the comparison results Vco(i) and Vco(i+1) from the comparators 31*i* and 31*i*+1 are at the "H" level, a digital value corresponding to a size of a signal obtained by adding the pixel signals from the two pixels adjacent to each other in the horizontal direction is outputted from the counter 32*i* belonging to the i-th column. This results from that under the control of the addition control portion 32, the count portion 322*i* for the second digit is instructed to carry out the counting one by one with one clock period synchronously with the clock signal CK for a time period for the "H" level.

Note that, in the phase of the horizontal addition mode, the addition control portion 33 carries out the control under which the counting operation of the counter, not using the addition for the pixels, of the paired two counters 32$i$ and 32$i$+1, that is, the counting operations of the count portions for the respective digits of the counter 32$i$+1 in the case are stopped. As a result, the power consumption can be saved.

The operation of the column processing portion 13A in Embodiment 1 configured as described above is summarized as follows. For example, as shown in FIG. 6, when the pixel signal Vsig(i) belonging to the i-th column is larger in size than the pixel signal Vsig(i+1) belonging to the (i+1)-th column, in the initial state, both the potentials of the comparison results Vco(i) and Vco(i+1) from the comparators 31$i$ and 31$i$+1 are at the "H" level. For this reason, while the "H" level is held, the count portion 322$i$ for the second digit carries out the 1-counting operation (the operation for adding 1) for performing the counting one by one with one clock period synchronously with the clock signal CK. As a result, the addition for the pixels is carried out between the two pixels, exhibiting the same color, adjacent to each other in the horizontal direction. Also, the digital value of the addition for the pixels is outputted from the counter 32$i$ belonging to the i-th column.

Next, when the level of the reference signal REF having the ramp-like waveform is reduced to a certain extent, one of the potentials of the comparison results Vco(i) and Vco(i+1) from the comparators 31$i$ and 31$i$+1, that is, the potential of the comparison result Vco(i) from the comparator 31$i$ in this case becomes the "L" level. For this reason, for a time period for which the potential of the comparison result Vco(i+1) from the other comparator 31$i$+1 is held at the "H" level, the count portion 321$i$ for the first digit of the counter 32$i$ belonging to the i-th column carries out the 1-counting operation with one clock period synchronously with the clock signal CK. At this time, no addition for the pixels is carried out, and the digital value corresponding to the size of the pixel signal from the pixel belonging to the (i+1)-th column is outputted from the counter 32$i$ belonging to the i-th column.

When the level of the reference signal REF having the ramp-like waveform is further reduced, and both thus the potentials of the comparison results Vco(i) and Vco(i+1) from the comparators 31$i$ and 31$i$+1 each become the "L" level, no counting operation in the counter 32$i$ belonging to the i-th column is carried out.

The above operation is carried out for both a dark signal when no photoelectric conversion is carried out in each of the pixels 20 in the pixel array portion 11, and a luminance signal when the photoelectric conversion is carried out in each of the pixels 20 in the pixel array portion 11.

Figure 7:
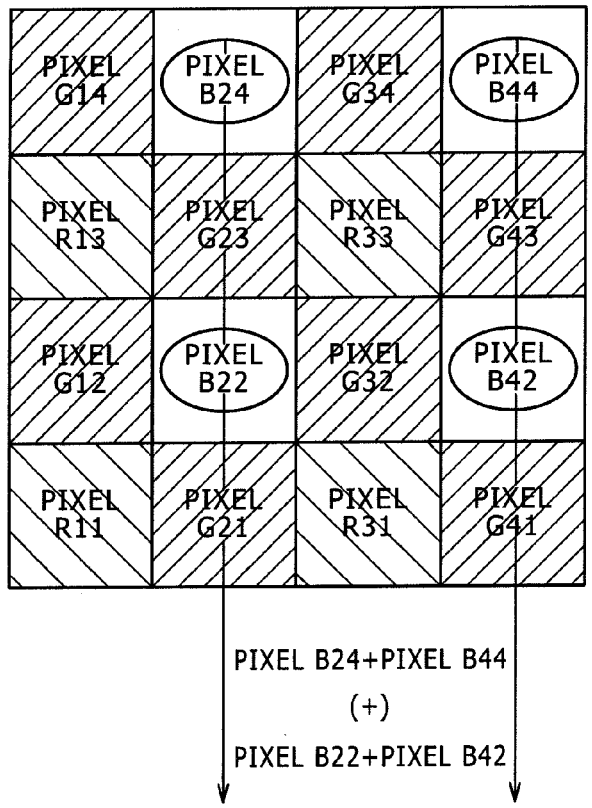
FIG. 7 is a diagram showing an arrangement of color filters used in an explanation of the operation of the column processing portion in the image pickup device according to Embodiment 1 of the present invention.
Figure 8:
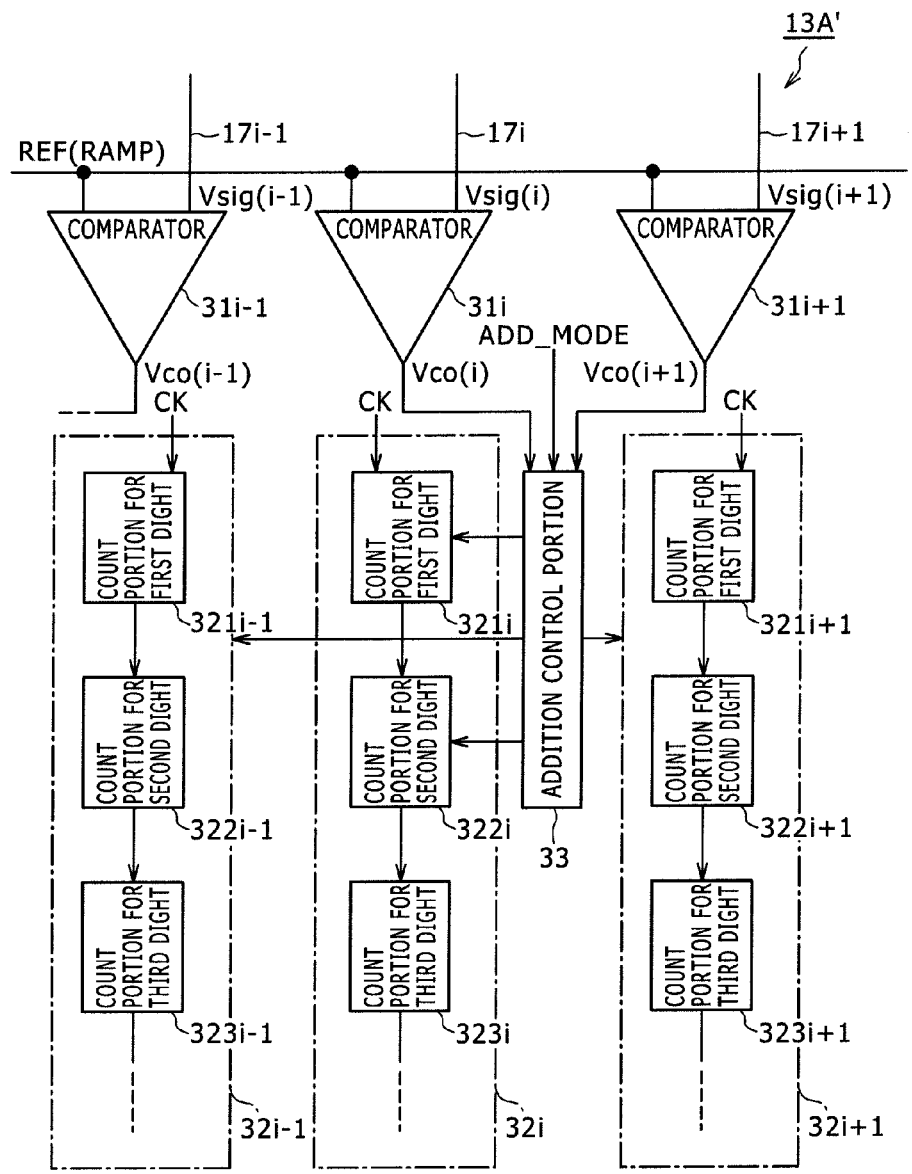
FIG. 8 is a block diagram showing a configuration of a column processing portion according to Change of Embodiment 1.

FIG. 7 shows a color filter arrangement in the pixel array portion 11. The column processing portion 13A in Embodiment 1 is used for the Bayer arrangement about Red (R), Green (G) and Blue (B). As a result, this is how the addition for the pixels in the horizontal direction can be carried out with respect to the pixels exhibiting the same color and belonging to the same row. The addition for the pixels is carried out between the dark signals and the luminance signals from a pixel B22 and a pixel B42, between the dark signals and the luminance signals from a pixel B24 and a pixel B44, and so on.

It is noted that for the Bayer arrangement shown in FIG. 7, one AD conversion circuit including the comparator 31 and the counter 32 is provided every adjacent two pixel columns as a unit. Also, the pixel signal is selectively inputted from one of the adjacent two pixel columns to the comparator 31 through a change-over switch (not shown).

As has been described, when in the phase of the horizontal addition mode, both the comparison results Vco(i) and Vco(i+1) from the comparators 31$i$ and 31$i$+1 are at the "H" level, the count portion 322$i$ for the second digit is instructed to carry out the 1-counting operation with one clock period, thereby making it possible to obtain the following effect. That is to say, since the addition for the two pixels in the horizontal direction can be realized within the column processing portion 13A, an amount of information horizontally outputted can be reduced by one half while the sensitivity is maintained. As a result, it is possible to realize the enhancement of the frame rate, and the reduction of the power consumption.

In addition thereto, since in the phase of the horizontal addition mode, the counting operation of the counter not used in the addition for the pixels is stopped, it is possible to further reduce the power consumption. In addition, the luminance signal information and the dark signal information, on the pixel B22 and the pixel B42, horizontally added to each other by utilizing the technique about the column processing portion 13A in Embodiment 1, and the luminance signal information and the dark signal information, on the pixel B24 and the pixel B44 can be vertically added to each other by utilizing the related technique (for example, the technique disclosed in Patent Document 1). As a result, since it is possible to realize the addition for the two pixels in both the horizontal and vertical directions, it is possible to further enhance the frame rate.

It is noted that in Embodiment 1, the first logic is set as the "H" level, and the second logic is set as the "L" level. Also, when the pixel signals Vsig(i) and Vsig(i+1) are each lower in level than the reference signal REF, the comparators 31$i$ and 31$i$+1 output the comparison results Vco(i) and Vco(i+1) each at the "H" level, and when the pixel signals Vsig(i) and Vsig(i+1) are each higher in level than the reference signal REF, the comparators 31$i$ and 31$i$+1 output the comparison results Vco(i) and Vco(i+1) each at the "L" level. However, this logic may be inverted. That is to say, a configuration may also be adopted such that when the pixel signals Vsig(i) and Vsig(i+1) are each lower in level than the reference signal REF, the comparators 31$i$ and 31$i$+1 output the comparison results Vco(i) and Vco(i+1) each at the "L" level (first logic), and when the pixel signals Vsig(i) and Vsig(i+1) are each higher in level than the reference signal REF, the comparators 31$i$ and 31$i$+1 output the comparison results Vco(i) and Vco(i+1) each at the "H" level (second logic).

In this case, when both the potentials of the comparison results Vco(i) and Vco(i+1) from the comparators 31$i$ and 31$i$+1 are at the "L" level, while the "L" level is held, the count portion 322$i$ for the second digit carries out the operation for counting 1 with one clock period synchronously with the clock signal CK. On the other hand, when both the potentials of the comparison results Vco(i) and Vco(i+1) from the comparators 31$i$ and 31$i$+1 are at the "H" level, the counting operation of the counter 32$i$ belonging to the i-th column may be stopped.

<Change of Embodiment 1>

In Embodiment 1, the addition for the two pixels exhibiting the same color and belonging to the same row in the horizontal direction is carried out with the two pixel columns i and i+1 as the unit. However, with regard to Change of Embodiment 1, a configuration can also be adopted such that the addition for the two pixels of the three pixels exhibiting the same color and belonging to the same row in the horizontal direction is carried out with the three pixel columns i−1, i and i+1 as a unit.

The addition for the two pixels of the three pixels exhibiting the same color and belonging to the same row in the horizontal direction is carried out by utilizing the technique of Embodiment 1, whereby the amount of information horizontally outputted can be halved while the sensitivity is maintained as compared with the case of the addition for the two pixels of the three pixels exhibiting the same color and belonging to the same row in the horizontal direction is carried out without utilizing the technique of Embodiment 1. Therefore, it is possible to realize the enhancement of the frame rate, and the reduction of the power consumption. In addition, the addition for the pixels in the vertical directions can also be carried out similarly to the case of Embodiment 1 by utilizing the technique of Embodiment 1 combined with the related technique (for example, the technique disclosed in Patent Document 1).

When the configuration of the column processing portion 13A' in Change is adopted, in the phase of a horizontal addition mode, only the count portions for the respective digits of the counter 32$i$ belonging to the i-th column are operated, and the counting operations of the counters 32$i$−1 and 32$i$+1 belonging to the remaining two pixel columns i−1 and i+1 are stopped. By carrying out this operation, it is possible to further reduce the power consumption.

In addition, it is also expected to adopt a method in which the addition for the two pixels of the three pixels exhibiting the same color and belonging to the same row is carried out, the normal AD conversion is carried out for one pixel belonging to the (i−1)-th column and having no relation to the addition in the counting operation of the counter 32$i$−1, and after completion of the horizontal output, the addition is carried out in the digital signal processing portion. In this case, the amount of information horizontally outputted can be reduced two-thirds while the sensitivity is maintained as compared with the case where the full addition for the (3×3) pixels in the horizontal and vertical directions is carried out. Therefore, it is possible to anticipate a certain degree of enhancement of the frame rate.

(Embodiment 2)

Figure 9:
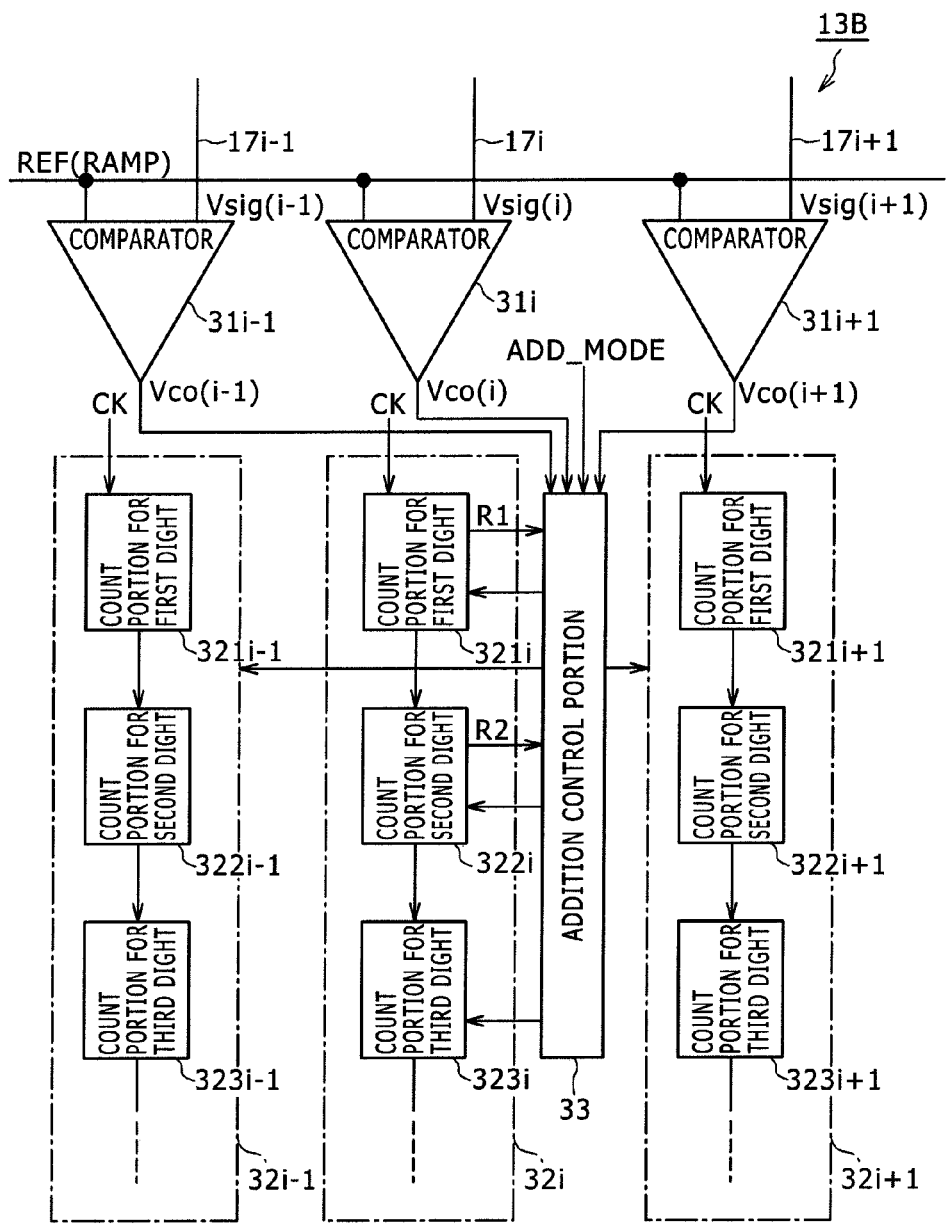
FIG. 9 is a block diagram showing a configuration of a column processing portion in an image pickup device according to Embodiment 2 of the present invention.

FIG. 9 is a block diagram, partly in circuit, showing a configuration of a column processing portion 13B in an image pickup device according to Embodiment 2 of the present invention. In the figure, the same portions as those in FIG. 3 are designated with the same reference numerals or symbols, respectively. In this case, three pixel columns are set as a unit, and a circuit configuration of three pixel columns of an (i−1)-th column, an i-th column and an (i+1)-th column is shown.

The column processing portion 13B in the image pickup device of Embodiment 2 includes comparators 31$i$−1, 31$i$ and 31$i$+1, and counters 32$i$−1, 32$i$ and 32$i$+1 which are each provided so as to correspond to the three pixel columns i−1, i and i+1, respectively. Also, the addition for the three pixels of the three pixels exhibiting the same color and belonging to the same row in the horizontal direction is realized. In the column processing portion 13B as well, the SDR counter is used as each of the counters 32$i$−1, 32$i$ and 32$i$+1. In addition, the configurations and operations of the comparators 31$i$ and 31$i$+1 are also the same as those in the column processing portion 13A previously stated.

Since in the case of the column processing portion 13A in Embodiment 1, the addition for the two pixels in the horizontal direction is carried out, the count portion 322$i$ for the second digit unconditionally counts 1 irrespective of the count value in the count portion 321$i$ for the first digit, thereby making it possible to realize the addition for the two pixels. On the other hand, whether or not each of the count portions 321$i$ to 323$i$ for the first to third digits needs to count 1 (addition of 1) changes depending on the count portions 321$i$ and 322$i$ for the first and second digits.

In the light of the foregoing, the following control is carried out in the column processing portion 13B in Embodiment 2. An addition control portion 33 receives as inputs thereof comparison results Vco(i−1), Vco(i) and Vco(i+1) from the comparators 31$i$−1, 31$i$ and 31$i$+1 corresponding to the three pixels exhibiting the same color and belonging to the same row, respectively, and values R1 and R2 in the count portions 321$i$ and 322$i$ for the first and second digits. Also, the addition control portion 33 controls whether or not the operation for counting 1 is carried out in each of the count portions 321$i$ to 323$i$ for the first to third digits synchronously with the clock signal CK based on the comparison results Vco(i−1), Vco(i) and Vco(i+1), and the values R1 and R2.

FIGS. 10A to 10C respectively show relationships between the comparison results Vco(i−1), Vco(i) and Vco(i+1) from the comparators 31$i$−1, 31$i$ and 31$i$+1, the values R1 and R2 in the count portions 321$i$ and 322$i$, and the control for the count portions 321$i$ to 323$i$ for the first to third digits.

Specifically, FIG. 10A shows a change in value in the count portion 321$i$ for the first digit, FIG. 10B shows a change in value in the count portion 322$i$ for the second digit, and FIG. 10C shows a change in value in the count portion 323$i$ for the third digit. It is noted that in FIGS. 10A to 10C, for each of the comparison results Vco(i−1), Vco(i) and Vco(i+1), and the values R1 and R2 in the count portions 321$i$ and 322$i$, the "L" level is described as the logic "0," and the "H" level is described as the logic "1."

(A) With Regard to Count Portion 321$i$ for First Digit

When the logics of the comparison results Vco(i−1), Vco(i) and Vco(i+1) are "000," "110," "011" or "101," the counting operation is inhibited irrespective of the values R1 and R2 of the count portions 321$i$ and 322$i$. When the logics of the comparison results Vco(i−1), Vco(i) and Vco(i+1) are "100," "010," "111" or "001," the 1-counting operation is carried out with one clock period synchronously with the clock signal CK irrespective of the values R1 and R2 in the count portions 321$i$ and 322$i$.

(B) With Regard to Count Portion 322$i$ for Second Digit

When the logics of the comparison results Vco(i−1), Vco(i) and Vco(i+1) are "000," the counting operation is inhibited irrespective of the values R1 and R2 in the count portions 321$i$ and 322$i$. When the logics of the comparison results Vco(i−1), Vco(i) and Vco(i+1) are "110," "011" or "101," the 1-counting operation is carried out with one clock period synchronously with the clock signal CK irrespective of the values R1 and R2 in the count portions 321$i$ and 322$i$.

Also, when the logics of the comparison results Vco(i−1), Vco(i) and Vco(i+1) are "100," "010" or "001," the counting operation is inhibited when the values R1 and R2 in the count portions 321$i$ and 322$i$ are "00" or "01," and the 1-counting operation is carried out when the values R1 and R2 in the count portions 321$i$ and 322$i$ are "10" or "11." Moreover, when the logics of the comparison results Vco(i−1), Vco(i) and Vco(i+1) are "111," the counting operation is inhibited when the values R1 and R2 in the count portions 321$i$ and 322$i$ are "10" or "11," and the 1-counting operation is carried out when the values R1 and R2 in the count portions 321$i$ and 322$i$ are "00" or "01."

(C) With Regard to Count Portion 323i for Third Digit

When the logics of the comparison results Vco(i−1), Vco(i) and Vco(i+1) are "000," the counting operation is inhibited irrespective of the values R1 and R2 in the count portions 321i and 322i. Also, when the logics of the comparison results Vco(i−1), Vco(i) and Vco(i+1) are "100," "010" or "001," the counting operation is inhibited when the values R1 and R2 in the count portions 321i and 322i are "00," "10" or "01," and the 1-counting operation is carried out when the values R1 and R2 in the count portions 321i and 322i are "11."

In addition, when the logics of the comparison results Vco(i−1), Vco(i) and Vco(i+1) are "110," "011" or "101," the counting operation is inhibited when the values R1 and R2 in the count portions 321i and 322i are "00" or "10," and the 1-counting operation is carried out when the values R1 and R2 in the count portions 321i and 322i are "11" or "01." Moreover, when the logics of the comparison results Vco (i−1), Vco(i) and Vco(i+1) are "111," the counting operation is inhibited when the values R1 and R2 in the count portions 321i and 322i are "00," and the 1-counting operation is carried out when the values R1 and R2 in the count portions 321i and 322i are "10," "11" or "01."

It should be noted that when in the phase of the horizontal addition mode, the control is carried out under which the counting operation of the counter(s), not used in the addition for the pixels, of a set of three counters 32i−1, 32i and 32i+1 is stopped, it is possible to realize the low power consumption. In the case of Embodiment 2, the control may be carried out under which the counting operations of the count portions for the respective digits in the counters 32i−1 and 32i+1 are stopped.

Here, when the addition centers are set at given intervals in the Bayer arrangement shown in FIG. 11, the processing in a semiconductor Digital Signal Processor (DSP) for the signal processing becomes simple. From this reason, the addition centers are preferably set at the given intervals because in the addition for the three pixels, a color of a representative coordinate point of a final image, and an original color are identical to each other. By the way, in the case of the addition for the two pixels, a color of a representative coordinate point of a final image, and an original color are different from each other.

In the Bayer arrangement shown in FIG. 11, the addition for the three pixels in the horizontal direction is carried out in such a way that the pixel signals from a pixel B44, a pixel B64 and a pixel B84 are added to one another, next, the pixel signals from a pixel R11, a pixel R31 and a pixel R51 are added to one another, and so forth. By carrying out the addition for the three pixels, the addition centers in the horizontal direction (the pixel B64 and the pixel B31 are both the addition centers in this case) can be set at the given intervals of the three pixels.

It is noted that for the Bayer arrangement shown in FIG. 11, one AD conversion circuit including the comparator 31 and the counter 32 is provided every adjacent two pixel columns as a unit similarly to the case of Embodiment 1. Also, one of the signals from the adjacent two pixel columns is selectively inputted to the comparator 31 through a change-over switch (not shown).

At this time, in carrying out the addition for the pixels with the addition centers in the horizontal direction being set at the given of the three pixels, the following procedure may be adopted. That is to say, four AD conversion circuits i−2, i−1, i, and i+1 corresponding to the adjacent eight pixel columns are set as a unit. Also, when the pixel signal is read out from the pixel corresponding to Red (R), the three AD conversion circuits i−2, i−1 and i on one side may be used. When the pixel signal is read out from the pixel corresponding to Blue (B), the three AD conversion circuits i−1, i and i+1 on the other side may be used.

In addition, the column processing portion 13B in Embodiment 2 is used for the Bayer arrangement shown in FIG. 11, whereby the addition for the three pixels in the horizontal direction can be carried out with respect to the pixels exhibiting the same color and belonging to the same row. Specifically, the addition for the three pixels is carried out among the dark signals and the luminance signals from the pixel B44, the pixel B64, and the pixel B84. Next, the addition for the three pixels is carried out among the dark signals and the luminance signals from the pixel B46, the pixel B66, and the pixel B86. Next, the addition for the three pixels is carried out among the dark signals and the luminance signals from the pixel B48, the pixel B68, and the pixel B88. After that, similarly, the addition for the three pixels in the horizontal direction is carried out with respect to the pixels exhibiting the same color and belonging to the same row.

As has been described, the comparison results Vco(i−1), Vco(i) and Vco(i+1) from the comparators 31i−1, 31i and 31i+1, and the values R1 and R2 in the count portions 321i and 322i for the first and second digits of the counter 32i are used in the phase of the horizontal addition mode. Also, the control relating to whether or not the 1-counting operation is carried out (1 is added) with one clock period synchronously with the clock signal CK in each of the count portions 321i to 323i for the first to third digits based on the comparison results Vco(i−1), Vco(i) and Vco(i+1), and the values R1 and R2, thereby making it possible to obtain the following effect. That is to say, the addition for the three pixels in the horizontal direction can be realized within the column processing portion 13B, whereby the amount of information horizontally outputted can be reduced to one-third while the sensitivity is maintained. Therefore, it is possible to realize the enhancement of the frame rate, and the reduction of the power consumption.

In addition, since the counting operation of the counter(s) not used in the addition for the pixels is stopped in the phase of the horizontal addition mode, it is possible to further reduce the power consumption. Further, a plurality piece of luminance signal information and a plurality piece of dark signal information which are horizontally added to one another by utilizing the technique about the column processing portion 13B in Embodiment 2 can also be vertically added to one another by utilizing the related technique (for example, the technique disclosed in Patent Document 1). Specifically, three pieces of luminance signal information and three pieces of dark signal information from the pixel B44, the pixel B64, and the pixel B84, three pieces of luminance signal information and three pieces of dark signal information from the pixel B46, the pixel B66, and the pixel B86, and three pieces of luminance signal information and three pieces of dark signal information from the pixel B48, the pixel B68, and the pixel B88 are vertically added to one another. As a result, since it is possible to realize the addition for the three pixels in both the horizontal and vertical directions, it is possible to realize the further enhancement of the frame rate.

Note that, when the pixel signals Vsig(i−1), Vsig(i) and Vsig(i+1) are each lower in level than the reference signal REF, the comparators 31i−1, 31i and 31i+1 output the comparison results Vco(i−1), Vco(i) and Vco(i+1) each at the "H" level, and when the pixel signals Vsig(i−1), Vsig(i) and Vsig(i+1) are each higher in level than the reference signal REF, the comparators 31i−1, 31i and 31i+1 output the comparison results Vco(i−1), Vco(i) and Vco(i+1) each at the "L" level. However, this logic may be inverted. That is to say, a configuration may also be adopted such that when the pixel signals Vsig(i−1), Vsig(i) and Vsig(i+1) are each higher in level than the reference signal REF, the comparators 31i−1, 31i and 31i+1 output the comparison results Vco(i−1), Vco(i) and Vco(i+1) each at the "H" level, and when the pixel signals Vsig(i−1), Vsig(i) and Vsig(i+1) are each lower in level than the reference signal REF, the comparators 31i−1, 31i and 31i+1 output the comparison results Vco(i−1), Vco(i) and Vco(i+1) each at the "L" level.

In addition, in Embodiment 2, the three comparators 31i−1, 31i and 31i+1, and the three counters 32i−1, 32i and 32i+1 which each correspond to the three pixel columns, respectively, are set as the unit. Also, the control relating to whether or not 1 is added to each of the first to third digits of one counter 32i is carried out based on the comparison results Vco(i−1), Vco(i) and Vco(i+1) from the three comparators 31i−1, 31i and 31i+1, and the values of the first and second digits of the one counter 32i of the three counters 32i−1, 32i and 32i+1. However, the present invention is by no means limited to the case where the three pixel columns are set as the unit. That is to say, the present invention may also be applied to the case where the four or more pixel columns are set as a unit basically in accordance with the same concept as that in the case of the three pixel columns are set as the unit.

(Embodiment 3)

FIG. 12 is a block diagram, partly in circuit, showing a configuration of a column processing portion 13C in an image pickup device according to Embodiment 3 of the present invention. In the figure, the same portions as those in FIG. 3 are designated with the same reference numerals or symbols. In this case, a circuit configuration of two pixel columns, i.e., an i-th column, and an (i+1)-th column is shown.

The column processing portion 13C in Embodiment 3 is identical in configuration to the column processing portion 13A in Embodiment 1 in that the column processing portion 13C includes comparators 31i and 31i+1, and the counter 32i and 32i+1 which are each provided so as to correspond to the two pixel columns i, and i+1, respectively. Hereinafter, the pixel column i, and the pixel column i+1 will be referred to as an even-numbered column, and an odd-numbered column, respectively, in some cases.

In the column processing portion 13A in Embodiment 1, the SDR counter in which 1 is added (1 is counted) to the least significant digit with the one period of the clock signal CK is used as each of the counters 32i and 32i+1. On the other hand, in the column processing portion 13C in Embodiment 3, a Double Data Rate (DDR) counter in which 1 is added to the least significant digit with a one half period of the clock signal CK is used as each of the counters 32i and 32i+1. Use of the DDR counter offers an advantage that the same AD conversion operation can be realized at a speed corresponding to the clock period which is half that of the clock signal CK period as compared with the case of use of the SDR counter.

Also, the feature of the column processing portion 13C in Embodiment 3 is that the counter 32i carries out the following operation under the control by the addition control portion 33. That is to say, when in the counter 32i, both potentials of comparison results Vco(i) and Vco(i+1) from the two comparators 31i and 31i+1 are at the "H" level, a count portion 322i for a second digit carries out a 1-counting operation with one half clock period synchronously with the clock signal CK. In addition, when one of the potentials of the comparison results Vco(i) and Vco(i+1) from the two comparators 31i and 31i+1 is at the "H" level, the count portion 322i for the second digit carries out the 1-counting operation with one clock period synchronously with the clock signal CK. Also, when both the potentials of the comparison results Vco(i) and Vco(i+1) from the two comparators 31i and 31i+1 are at the "L" level, the count portion 322i for the second digit carries out no counting operation.

It is noted that FIG. 12 merely simplifies the concept of the column processing portion 13C in Embodiment 3 in the form of the block diagram.

<LSB Circuit Belonging to Even-Numbered Column>

FIG. 13 is a block diagram showing a concrete circuit configuration of a Least Significant Bit (LSB) count portion (an LSB circuit belonging to an even-numbered column) 321i. The LSB count portion 321i in Embodiment 3 includes latches 40, 41 and 42, a first non-inverting/inverting circuit 43, inverters 44 and 45, a second non-inverting/inverting circuit 46, and an up/down control portion 47.

The latch circuit 40 latches therein the clock signal CK in response to a control signal COB0 supplied from the addition control portion 33. The latch circuit 41 latches therein the clock signal CK in response to a control signal COB1 supplied from the addition control portion 33. The clock signal CK latched in the latch circuit 40 is supplied to an input node LT of the first non-inverting/inverting circuit 43. The clock signal CK latched in the latch circuit 41 is supplied in the form of a control signal aff, and an inverting control signal affx obtained through inversion in the inverter 45 to the first non-inverting/inverting circuit 43.

Here, a concrete configuration of the addition control portion 33 will be described. The addition control portion 33 includes an OR circuit 331 and an AND circuit 332. The OR circuit 331 receives as two inputs thereof the comparison results Vco(i) and Vco(i+1) from the two comparators 31i and 31i+1. When at least one of the potentials of the comparison results Vco(i) and Vco(i+1) is at the "H" level, the OR circuit 331 outputs the control signal COB0. The AND circuit 332 receives as two inputs thereof the comparison results Vco(i) and Vco(i+1) from the two comparators 31i and 31i+1. When at least one of the potentials of the comparison results Vco(i) and Vco(i+1) is at the "H" level, the AND circuit 332 outputs the control signal COB1.

As a result, when at least one of the potentials of the comparison results Vco(i) and Vco(i+1) from the two comparators 31i and 31i+1 is at the "H" level, the latch circuit 40 latches therein the clock signal CK in response to the control signal COB0 outputted from the OR circuit 331. When both the potentials of the comparison results Vco(i) and Vco(i+1) from the two comparators 31i and 31i+1 are at the "H" level, the latch circuit 41 latches therein the clock signal CK in response to the control signal COB1 outputted from the AND circuit 332.

The first non-inverting/inverting circuit 43 carries out the control relating to whether the clock signal CK after having been latched in the latch circuit 40 should be transferred (non-inverting-transferred) with a polarity of the clock signal CK being held as it is (non-inverting), or is transferred (inverting-transferred) with the polarity of the clock signal CK being inverted. This control is carried out in accordance with the control signal aff and the inverting control signal affx supplied from the latch circuit 41.

FIGS. 14A and 14B show changes in potential at the input node LT of the first inverting/non-inverting circuit 43, the potential of the inverting control signal affx, and the potential at the output node FO of the first inverting/non-inverting circuit 43.

A timing waveform chart shown in FIG. 14A is different from that shown in FIG. 14B in timing when the logic state transits from a state in which both the potentials of the comparison results Vco(i) and Vco(i+1) from the two comparators 31i and 31i+1 are each at the "H" level to a state in which one of the potentials of the comparison results Vco(i) and Vco(i+1) from the two comparators 31i and 31i+1 is at the "H" level. Specifically, the timing shown in FIG. 14B is shifted from the timing shown in FIG. 14A by one half clock of the clock signal CK supplied to the input node LT.

Here, the value (the "H" level or the "L" level) at the output node FO when both the potentials of the comparison results Vco(i) and Vco(i+1) from the two comparators 31i and 31i+1 are at the "L" level becomes the final count result in the LSB count portion 321i. The fact that the timing when the logic state transits from the state in which both the potentials of the comparison results Vco(i) and Vco(i+1) from the two comparators 31i and 31i+1 are at the "H" level to the state in which one of the potentials of the comparison results Vco(i) and Vco(i+1) from the two comparators 31i and 31i+1 is at the "H" level is shifted by one half clock period means that the count value is different between these logic states by "1."

When both the potentials of the comparison results Vco(i) and Vco(i+1) from the two comparators 31i and 31i+1 are at the "H" level in FIG. 14A, the inverting control signal affx is a clock signal which is in phase with the clock signal CK supplied to the input node LT. Also, the first non-inverting/inverting circuit 43 non-inverting-transfers the clock signal CK at the "L" level at the input node LT, and inverting-transfers the clock signal CK at the "H" level at the input node LT under the control made in accordance with the control signal aff and the inverting control signal affx. As a result, the potential at the output node FO is usually held at the "L" level.

When one of the potentials of the two comparison results Vco(i) and Vco(i+1) is at the "H" level, the "L" level of the inverting control signal affx in the phase of the transition from the logic state in which both the potentials of the comparison results Vco(i) and Vco(i+1) are at the "H" level is held as it is. Also, the first non-inverting/inverting circuit 43 usually carries out the non-inverting transfer under the control mode in accordance with the control signal aff and the inverting control signal affx. As a result, the clock signal CK supplied to the input node LT is transmitted to the output node FO as it is.

When both the potentials of the two comparison results Vco(i) and Vco(i+1) are at the "L" level, the "L" level of the inverting control signal affx in the phase of the transition from the logic state in which one of the potentials of the two comparison results Vco(i) and Vco(i+1) is at the "H" level is held as it is. Also, the first non-inverting/inverting circuit 43 usually carries out the non-inverting transfer under the control made in accordance with the control signal aff and the inverting control signal affx. As a result, the "L" level of the clock signal CK at the input node LT is transmitted to the output node FO as it is.

It should be noted that although the case where the potential at the input node LT is fixed to the "L" level when the logic state transits from the state in which one of the potentials of the two comparison results Vco(i) and Vco(i+1) is at the "H" level to the state in which both the potentials of the two comparison results Vco(i) and Vco(i+1) are at the "L" level is given as the example in this case, the potential at the input node LT may be fixed to the "H" level. In this case, the potential of the "H" level at the input node LT is transmitted to the output node FO as it is.

When one of the potentials of the two comparison results Vco(i) and Vco(i+1) is at the "H" level, the "H" level of the inverting control signal affx in the phase of the transition from the logic state in which both the potentials of the two comparison results Vco(i) and Vco(i+1) are at the "H" level is held as it is. Also, the first non-inverting/inverting circuit 43 usually carries out the non-inverting transfer under the control made in accordance with the control signal aff and the inverting control signal affx. As a result, the polarity of the clock signal CK at the input node LT is inverted, and the resulting signal is transmitted to the output node FO.

When both the potentials of the two comparison results Vco(i) and Vco(i+1) are at the "L" level, the "H" level of the inverting control signal affx in the phase of the transition from the logic state in which one of the potentials of the two comparison results Vco(i) and Vco(i+1) are at the "H" level is held as it is. Also, the first non-inverting/inverting circuit 43 usually carries out the inverting transfer under the control made in accordance with the control signal aff and the inverting control signal affx. As a result, the "L" level of the potential at the input node LT is inverted, and the resulting signal is transmitted to the output node FO.

It should be noted that although the case where the potential at the input node LT is fixed to the "L" level when the logic state transits from the state in which one of the potentials of the two comparison results Vco(i) and Vco(i+1) is at the "H" level to the state in which both the potentials of the two comparison results Vco(i) and Vco(i+1) are at the "L" level is given as the example in this case, the potential at the input node LT may be fixed to the "H" level. In this case, the "H" level of the potential at the input node LT is inverted, and the resulting signal at the "L" level is transmitted to the input node FO.

The second non-inverting/inverting circuit 46 carries out the control relating to whether the clock signal CK which is non-inverting-transferred or inverting-transferred in polarity thereof in the first non-inverting/inverting circuit 43, and is then inverted in the converter 44 should be non-inverting-transferred or inverting-transferred again. This control is carried out based on the contents latched in the latch circuit 42. The latch circuit 42 holds the logic state (the "H" level or the "L" level) of the potential at the node PD on the output side of the second non-inverting/inverting circuit 45 when a potential of a control signal FLIPLSB changes from the "L" level to the "H" level while the potential of the control signal FLIPLSB changes in the order of the "L" level→the "H" level→the "L" level. The control signal FLIPLSB is a signal in accordance with which the latch circuit 42 and a latch circuit 621 (refer to FIG. 16) which will be described later are each controlled, and is generated in the system control portion 15 shown in FIG. 1.

The counter 32i counts each of the dark signal and the luminance signal. At this time, the logic state in the phase of the end of the counting is latched with respect to the dark signal in accordance with the control signal FLIPLSB. Also, whether the counting of the luminance signal should be started at the transition of the clock signal CK from the "L" level to the "H" level or at the transition of the clock signal CK from the "H" level to the "L" level is controlled in accordance with the control signal FLIPLSB. Here, the control signal FLIPLSB determines the timing of latching the logic state. Therefore, the control signal FLIPLSB changes as an example in the order of the "L" level→the "H" level→the "L" level before the luminance signal is counted after the counting of the dark signal has been completed.

As a result, the second non-inverting/inverting circuit 46 controls whether the clock signal CK inputted thereto through the inverter 44 should be non-inverting-transferred or inverting-transferred when the potential of the control signal FLIPLSB changes from the "L" level to the "H" level and then changes from the "H" level to the "L" level, i.e., becomes the "L" level again.

When the potential at the node PD is held at the "H" level in a state in which the dark signal outputted from the pixel 20 without being photoelectrically converted has been done with the AD conversion based on the operation of the second non-inverting/inverting circuit 46, the control can be carried out so that the potential at the node PD starts with the change of the "H" level to the "L" level. In addition, when the potential at the node PD is at the "L" level in a state in which the dark signal has been done with the AD conversion, the control can be carried out so that the potential at the node PD starts with the change of the "L" level to the "H" level.

The up/down control portion 47 carries out the control relating to whether up-count or down-count should be carried out. An output COUT, from the up/down control portion 47, as an output from the count portion 321$i$ for the first digit is transmitted to the count portion 322$i$ for the second digit.

<Count Portion for Second Digit>

FIG. 15 is a block diagram, partly in circuit, showing a circuit configuration of the count portion 322$i$ for the second digit belonging to the pixel column i. The count portion 322$i$ for the second digit belonging to the pixel column i includes Flip-Flops (FF) 51 and 52 which are connected to each other in a two-stage cascade form, an up/down control portion 53, and a holding portion 54 for holding therein contents of the counter. Also, the count portion 322$i$ for the second digit receives as an input CIN thereof an output COUT from the count portion 321$i$ for the first digit. The input CIN is inverted in polarity thereof by an inverter 55, and is supplied as a negative-phase-sequence clock signal xck to the flip-flop 51. Also, the inverted input is further inverted in polarity thereof by an inverter 56, and is supplied as a positive-phase-sequence clock signal ck to the flip-flop 52.

Storage states of the flip-flops 51 and 52 can be controlled from the outside in accordance with control signals RHA and XRLA inputted to SET terminals, and control signals RHB and XRLB inputted to RESET terminals, respectively. The up/down control portion 53 controls whether the up-count or the down-count should be carried out. Here, an up-count mode is used in AD-converting the luminance signal, and a down-count mode is used in AD-converting the dark signal.

The holding portion 54 holds therein the storage contents of the counter based on the operations of the flip-flops 51 and 52 when the up-count and the down-count are switched over each other. When the up-count and the down-count are switched over each other, the potential of the control signal CTHLD is set at the "H" level, and the potential of the control signal xCTHLD is set at the "L" level in order to prevent the storage contents of the counter from being changed.

The positive-phase-sequence clock ck and the negative-phase-sequence clock xck which are generated based on the input CIN are inputted together with the comparison result Vco(i) from the comparator 31$i$ belonging to the even-numbered column i to a control clock generating portion 57. The control clock generating portion 57 generates control pulses CG1 and CG2, and inverting control pulses XCG1 and XCG2 obtained by inverting the polarities of the control pulses CG1 and CG2, respectively, in accordance with the logics of the control signal COB1 outputted from the AND circuit 332 of the addition control portion 33, and the positive-phase-sequence clock signal ck and the negative-phase-sequence clock signal xck.

Specifically, when the potentials of the negative-phase-sequence clock signal xck and the control signal COB1 are at the "H" level, the potential of the control pulse CG1 is set as the "H" level, and the potential of the inverting control pulse XCG1 is set at the "L" level. In any case other than the above case, the potential of the control pulse CG1 is set as the "L" level, and the potential of the inverting control pulse XCG1 is set at the "H" level. In addition, when both the potentials of the positive-phase-sequence clock signal ck and the control signal COB1 are at the "H" level, the potential of the control pulse CG2 is set as the "H" level, and the potential of the inverting control pulse XCG2 is set as the "L" level. In any case other than the above case, the potential of the control pulse CG2 is set as the "L" level, and the potential of the inverting control pulse XCG2 is set at the "H" level. The control pulse CG1 and the inverting control pulse XCG1, and the control pulse CG2 and the inverting control pulse XCG2 are all supplied to an FF control portion 58.

The FF control portion 58 generates the control signals RHA, XRLA, and control signals RHB, XRLB described above based on the control pulse CG1 and the inverting control pulse XCG1, and the control pulse CG2 and the inverting control pulse XCG2, respectively, thereby controlling the storage states of the flip-flops 51 and 52 from the outside. Specifically, when the potential of the control pulse CG1 is at the "H" level, and the potential of the control pulse XCG1 is at the "L" level, a value LSB2IN of the count portion 321$i$+1 for the first digit belonging to the odd-numbered column i+1 is outputted as each of the control signals RHA and XRLA. In addition, when the potential of the control pulse CG1 is at the "L" level, and the potential of the control pulse XCG1 is at the "H" level, the control signals RH and XRL which are supplied from the outside are outputted as the control signals RHA and XRLA, respectively.

When the potential of the control pulse CG2 is at the "H" level, and the potential of the control pulse XCG2 is at the "L" level, a value LSB2IN of the count portion 321$i$+1 for the first digit belonging to the odd-numbered column i+1 is outputted as each of the control signals RHB and XRLB. In addition, when the potential of the control pulse CG2 is at the "L" level, and the potential of the control pulse XCG2 is at the "H" level, the control signals RH and XRL which are supplied from the outside are outputted as the control signals RHB and XRLB, respectively.

Here, for a time period for which at least one of the potentials of the comparison results Vco(i) and Vco(i+1) from the two comparators 31$i$ and 31$i$+1 is at the "L" level, of the phase of the horizontal non-addition mode and the phase of the horizontal addition mode, the control signal RH is outputted as each of the control signals RHA and RHB. In addition, the control signal XRL is outputted as each of the control signals XRLA and XRLB. In this state, the logic states of the flip-flops 51 and 52 can be initialized in accordance with the control signals RH and XRL supplied from the outside.

Both the potentials of the control signals RH and XRL are set at the "H" level, whereby both the potentials at the output nodes sla1 and msa1 of the flip-flops 51 and 52 can be initialized at the "L" level. In addition, both the potentials of the control signals RH and XRL are set at the "L" level, whereby both the potentials at the output nodes sla1 and msa1 of the flip-flops 51 and 52 can be initialized at the "H" level. In a phase of a normal operation different from the initializing operation, the potential of the control signal RH is used as "L" level, and the potential of the control signal XRL is used as "H" level.

For the time period for which at least one of the potentials of the comparison results Vco(i) and Vco(i+1) from the two comparators 31$i$ and 31$i$+1 is at the "L" level of the phase of the horizontal non-addition mode and the phase of the horizontal addition mode, the potential of the control signal RH is set as the "L" level, and the potential of the control signal XRL is set as the "H" level. As a result, the count portion 322$i$ for the second digit of the normal counter 32$i$ operates so as to receive as the input CIN thereof the output COUT from the count portion 321$i$ for the first digit. Therefore, the count portion 321$i$ for the first digit operates so as to add 1 to the count portion for the second digit of the counter every one clock period when one of the potentials of the comparison results Vco(i) and Vco(i+1) from the two comparators 31$i$ and 31$i$+1 is at the "H" level in the phase of the horizontal addition mode (1-counting operation).

In addition, when both the potentials of the comparison results Vco(i) and Vco(i+1) from the two comparators 31$i$ and 31$i$+1 are at the "L" level, the potential of the input CIN is fixed to either the "H" level or the "L" level. Therefore, the count portion 321$i$ for the first digit operates so as not to add 1 to the count portion for the second digit of the counter when both the potentials of the comparison results Vco(i) and Vco(i+1) from the two comparators 31$i$ and 31$i$+1 are at the "L" level in the phase of the horizontal addition mode.

For a time period, for which both the potentials of the comparison results Vco(i) and Vco(i+1) from the two comparators 31$i$ and 31$i$+1 are held at the "H" level, of the phase of the horizontal addition mode, the operation is carried out as follows. When the potential of the negative-phase-sequence clock signal xck is at the "H" level, and the potential of the positive-phase-sequence clock signal ck is at the "L" level, the value LSB2IN of the count portion 321$i$+1 for the first digit belonging to the odd-numbered column i+1 is outputted as each of the control signals RHA and XRLA. Also, an inverted value of the value LSB2IN is substituted (set) into the output node sla1 of the flip-flop 51. As a result, the potential at the inner node sla0 of the flip-flop 51 can be rewritten and is inverted in logic thereof in the order of sla1→msa0→msa1→din to be transferred. Also, the potentials at the nodes msa0, msa1, and din can also be rewritten, and a value LSB2OUT of the count portion 322$i$ for the second logic can also be rewritten.

When the potential of the negative-phase-sequence clock signal xck is at the "L" level, and the potential of the positive-phase-sequence clock signal ck is at the "H" level, the value LSB2IN of the count portion 321$i$+1 for the first digit belonging to the odd-numbered column i+1 is outputted as each of the control signals RHB and XRLB. Also, an inverted value of the value LSB2IN is substituted (set) into the output node msa1 of the flip-flop 52. As a result, the potential at the inner node msa0 of the flip-flop 52 can also be rewritten. In addition, the potential at the inner node msa0 is inverted in logic thereof in the order of msa1→din→sla0→sla1 to be transferred, whereby the potentials at the nodes din, sla0 and sla1 can also be written, and the value LSB2OUT of the counter 322$i$ for the second digit can also be written.

Therefore, for the time period, for which both the potentials of the two comparison results Vco(i) and Vco(i+1) from the two comparators 31$i$ and 31$i$+1 are held at the "H" level, of the phase of the horizontal addition mode, the value LSB2IN of the count portion 321$i$+1 can be written to the value LSB2OUT of the counter 322$i$ for the second digit. When both the potentials of the two comparison results Vco(i) and Vco(i+1) from the two comparators 31$i$ and 31$i$+1 are at the "H" level, the value LSB2IN of the count portion 321$i$+1 for the first digit belonging to the odd-numbered column i+1 is set so that 1 is added to the count portion for the second digit of the counter every one half clock period. Therefore, when both the potentials of the two comparison results Vco(i) and Vco(i+1) from the two comparators 31$i$ and 31$i$+1 are at the "H" level, the operation can be carried out so that 1 is added to the count portion for the second digit of the counter every one half clock period.

<LSB Circuit Belonging to Odd-Numbered Column>

FIG. 16 is a block diagram, partly in circuit, showing a concrete circuit configuration of the LSB count portion 321$i$+1 belonging to the pixel column i+1 (the LSB circuit belonging to the odd-numbered column). The LSB circuit portion 321$i$+1 in Embodiment 3 includes a latch portion 61, a coherency control portion 62, and a stop control portion 63, an up/down control portion 64, and a selection portion 65.

The latch portion 61 receives as inputs thereof the control signal COB2 outputted from the AND circuit 332 of the addition control portion 33, and the clock signal CK. The latch portion 61 holds therein a logic state when the potential of the control signal COB2 transits from the "H" level to the "L" level.

Here, the control signal COB2 is a signal corresponding to the control signal COB1 used in the LSB count portion 321$i$. The potential of the control signal COB1 is usually held at the "L" level when no addition is carried out. On the other hand, the control signal COB2 becomes the comparison result Vco(i+1) from the comparator 31$i$+1 when no addition is carried out.

The coherency control portion 62 controls whether a potential of an output starts with the "H" level or the "L" level for obtaining coherency with the last count result, and holds information therefor in the latch circuit 62. Specifically, the coherency control portion 62 checks a logic state of a potential (an "H" level or an "L" level) at a node LATIN1 when the potential of the control signal FLIPLSB changes from the "L" level to the "H" level while the potential of the signal FLIPLSB changes in the order to the "L" level→the "H" level→the "L" level. Also, the coherency control portion 62 controls whether the signal at the node LT should be non-inverting-transferred or inverting-transferred to the node FO when the potential of the control signal FLIPLSB changes from the "H" level to the "L" level, and thus is set at the "L" level again.

The stop control portion 63 carries out the control so as to stop the count portions in and after the count portion 322$i$+1 for the second digit in the phase of the addition mode. Specifically, when a potential of an addition mode signal ADD_MODE is at the "H" level, and a potential of an inverting addition mode signal XADD_MODE is set at the "L" level, the stop control portion 63 connects a node PD to a negative side power source potential VSS, and fixes a potential at the node PD to the "L" level. As a result, the stop control portion 63 stops the count portions in and after the count portion 322$i$+1 for the second digit belonging to the odd-numbered column i+1 in the phase of the addition mode. As a result, it is possible to save the power consumption.

The up/down control portion 64 carries out the control relating to whether the up-count or the down-count should be carried out in accordance with up/down change-over control signals UDSL and XUDSL.

The selection portion 65 selects whether the value LSB2IN of the count portion 321i+1 for the first digit belonging to the odd-numbered column i+1 or the value LSB2OUT of the count portion 322i for the second digit belonging to the even-numbered column i should be transmitted to the node LATIN1 of the coherency control portion 62.

Specifically, when the potential of the addition mode signal ADD_MODE is at the "L" level, and the potential of the inverting addition mode signal XADD_MODE is at the "H" level, the selection portion 65 transmits the value LSB2IN of the count portion 321i+1 for the first digit belonging to the odd-numbered column i+1 to the node LATIN1. Therefore, the selection portion 65 operates as the normal counter LSB circuit in the phase of the horizontal non-addition mode, thereby inputting the value LSB2IN of the count portion 321i+1 for the first digit belonging to the odd-numbered column i+1 to the count portion 322i+1 for the second digit from the LSB belonging to the odd-numbered column i+1.

In addition, when the potential of the addition mode signal ADD_MODE is at the "H" level, and the potential of the inverting addition mode signal XADD_MODE is at the "L" level, the selection portion 65 transmits the value LSB2OUT of the count portion 322i for the second digit belonging to the even-numbered column i to the node LATIN1. Therefore, although the selection portion 65 operates as the LSB circuit in the phase of the horizontal addition mode as well, the selection portion 65 inputs the value LSB2IN of the count portion 321i+1 for the first digit belonging to the odd-numbered column i+1 to the count portion 322i for the second digit from the count portion 321i for the first digit belonging to the even-numbered column i.

As a result, the value LSB2IN of the count portion 321i+1 belonging to the first digit is directly substituted as each of the control signals RHA, XRLA, and RHB, XRLB (refer to FIG. 15) into the flip-flops 51 and 52, respectively. In such a manner, when both the potentials of the two comparison results Vco(i) and Vco(i+1) from the two comparators 31i and 31i+1 are at the "H" level, the operation can be carried out so that 1 is added to the count portion 322i for the second digit of the counter 32i belonging to the even-numbered column i every one half clock period (1-counting operation).

In the phase of the horizontal non-addition mode, when the value LSB2IN of the count portion 321i+1 for the first digit belonging to the odd-numbered column i+1 is at the "H" level in a state in which the dark signal has been done with the AD conversion, the control is carried out in such a way that the value LSB2IN starts with a change of the "H" level to the "L" level based on the operations of the coherency control portion 62 and the selection portion 65. On the other hand, when the value LSB2IN of the count portion 321i+1 for the first digit belonging to the odd-numbered column i+1 is at the "L" level in the state in which the dark signal has been done with the AD conversion, the control is carried out in such a way that the value LSB2IN starts with a change of the "L" level to the "H" level.

In the phase of the horizontal addition mode, when the value LSB2OUT of the count portion 322i for the second digit belonging to the even-numbered column i is at the "H" level in a state in which the dark signal has been done with the AD conversion, the control is carried out in such a way that the value LSB2OUT starts with a change of the "H" level to the "L" level. On the other hand, when the value LSB2OUT of the count portion 322i for the second digit belonging to the even-numbered column i is at the "L" level in the state in which the dark signal has been done with the AD conversion, the control is carried out in such a way that the value LSB2OUT starts with a change of the "L" level to the "H" level.

It is noted that in the phase of the horizontal addition mode, for a time period from end of the counting of the dark signal to start of the counting of the luminance signal, the latch circuit 42 in the count portion 321i for the first digit belonging to the even-numbered column i stores therein a least significant bit. In addition, for the time period from end of the counting of the dark signal to start of the counting of the luminance signal, the latch circuit 621 in the count portion 321i+1 for the first digit belonging to the odd-numbered column i+1 stores therein the second bit from the least significant bit.

According to the column processing portion 13C in Embodiment 3 of the present invention described above, the addition for the pixels in the horizontal direction is carried out within the column processing portion 13C, thereby making it possible to reduce the amount of information horizontally outputted while the sensitivity is maintained similarly to the case of each of the column processing portions 13A and 13B in Embodiment 1 and 2. Therefore, it is possible to realize the enhancement of the frame rate, and the reduction of the power consumption. In addition thereto, the following operation and effect can be obtained.

In the column processing portion 13C in Embodiment 3, when one of the potentials of the comparison results Vco(i) and Vco(i+1) from the two comparators 31i and 31i+1 is at the "H" level, the two flip-flops 51 and 52 are used in which the clock signals ck and xck each synchronized with the clock signal CK are received at the respective clock terminals. Also, the two flip-flops 51 and 52 are used in which when both the potentials of the comparison results Vco(i) and Vco(i+1) from the two comparators 31i and 31i+1 are at the "H" level, the control signals RH and XRL each synchronized with the clock signal CK are received at the set terminals and the reset terminals, respectively. As a result, when both the potentials of the comparison results Vco(i) and Vco(i+1) from the two comparators 31i and 31i+1 are at the "H" level, the count portion 322i for the second digit of the counter 32i can be caused to carry out the 1-counting operation with one half clock period of the clock signal CK. On the other hand, when one of the potentials of the comparison results Vco(i) and Vco(i+1) from the two comparators 31i and 31i+1 is at the "H" level, the count portion 322i for the second digit of the counter 32i can be caused to carry out the 1-counting operation with one clock period of the clock signal CK.

In addition, the column processing portion 13C has the circuit (the latch circuit 41 shown in FIG. 13) which passes the clock signal CK when both the potentials of the comparison results Vco(i) and Vco(i+1) from the two comparators 31i and 31i+1 are at the "H" level, and holds therein the current signal level when at least one of the potentials of the comparison results Vco(i) and Vco(i+1) is at the "L" level. Moreover, the column processing portion 13C has the circuit (the latch circuit 40 shown in FIG. 13) which passes the clock signal CK when at least one of the potentials of the comparison results Vco(i) and Vco(i+1) is at the "H" level, and holds therein the current signal level when both the potentials of the comparison results Vco(i) and Vco(i+1) are at the "L" level. Also, when one of the potentials of the comparison results Vco(i) and Vco(i+1) is at the "H" level, the clock signal CK is outputted through these two circuits. Thus, when the state in which when one of the potentials of the comparison results Vco(i) and Vco(i+1) is at the "H" level starts, the output signal necessarily starts with the rising to the "H" level. As s result, when both the potentials of the comparison results Vco(i) and Vco(i+1) end at the "H" level, and the state in which one of the potentials of the comparison results Vco(i) and Vco(i+1) is at the "L" level starts, a rising portion of the clock signal CK can be firstly outputted.

Moreover, the column processing portion 13C does not specially have a circuit which operates as the LSB circuit when both the potentials of the comparison results Vco(i) and Vco(i+1) from the two comparators 31i and 31i+1 are at the "H" level, and which carries out the 1-counting operation every one half clock period in the count portion 322i for the second digit of the counter 32i. Likewise, the column processing portion 13C does not specially have a circuit which operates as the LSB circuit when one of the potentials of the comparison results Vco(i) and Vco(i+1) from the two comparators 31i and 31i+1 is at the "H" level, and which carries out the 1-counting operation every one clock period in the count portion 322i for the second digit of the counter 32i.

That is to say, the column processing portion 13C does not specially have the portions of the two circuits described above, but adopts the circuit configuration of using the portion of the circuit which operates as the LSB circuit in the phase of the non-addition mode belonging to the even-numbered column i, and the portion of the circuit which operates as the LSB circuit in the phase of the non-addition mode belonging to the odd-numbered column i+1. As a result, the occupation area of the circuits can be made very small because it is possible to obtain the configuration in which the function of the addition for the pixels in the horizontal direction is given with the very less increase in number of transistors (for example, the number of transistors increases by 78 every two pixel columns as compared with the case of no addition).

Here, the portion of the circuit which operates as the LSB circuit in the phase of the non-addition mode belonging to the even-numbered column i is the count portion 321i for the first digit belonging to the even-numbered column. The count portion 321i has the function of the circuit which operates as the LSB circuit when one of the potentials of the comparison results Vco(i) and Vco(i+1) from the two comparators 31i and 31i+1 is at the "H" level in the phase of the addition mode. In addition, the portion of the circuit which operates as the LSB circuit in the phase of the non-addition mode belonging to the odd-numbered column i+1 is the circuit portion 321i+1 for the first digit belonging to the odd-numbered column. The count portion 321i+1 has the function of the circuit which operates as the LSB circuit when both the potentials of the comparison results Vco(i) and Vco(i+1) from the two comparators 31i and 31i+1 are at the "H" level in the phase of the addition mode.

It should be noted that in Embodiment 3 as well, similarly to the case of Embodiment 1, in the phase of the horizontal addition mode, the addition control portion 33 carries out the control under which the counting operation of the counter, not using the addition for the pixels, of the paired two counters 32i and 32i+1 is stopped, thereby making it possible to save the power consumption.

(Embodiment 4)

FIG. 17 is a block diagram, partly in circuit, showing a configuration of a column processing portion 13D in an image pickup device according to Embodiment 4 of the present invention. In the figure, the same portions as those in FIG. 3 are designated with the same reference numerals or symbols, respectively. In this case as well, a circuit configuration of two pixel columns, i.e., an i-th column, and an (i+1)-th column is shown.

The column processing portion 13D in Embodiment 4 is identical in configuration to the column processing portion 13A in Embodiment 1 in that the column processing portion 13D includes comparators 31i and 31i+1, and the counters 32i and 32i+1 which are each provided so as to correspond to the two pixel columns i and i+1, respectively.

The column processing portion 13A in Embodiment 1 uses the SDR counter which carries out the counting operation for counting 1 with one period of the clock signal CK with respect to all the digits of each of the counters 32i and 32i+1. On the other hand, the column processing portion 13D in Embodiment 4 adopts the following configuration with respect to one of the two counters 32i and 32i+1, for example, the counter 32i.

That is to say, in one counter 32i, a configuration that a DDR counter 3211 as a first count portion, and an SDR counter 3212 as a second count portion are used in combination in the count portion 321i for the first digit.

The DDR counter 3211 carries out the counting operation for counting 1 with one half clock period. The SDR counter 3212 carries out the counting operation for counting 1 with one clock period. Also, the SDR counter is used as each of count portions in and after the count portion 322i for the second digit similarly to the case of Embodiment 1.

In the other counter 32i+1, the DDR counter is used as the count portion 321i+1 for the first digit. Also, the SDR counter is used as each of count portions in and after the count portion 322i+1 for the second digit similarly to the case of Embodiment 1.

Also, the feature of the addition control portion 33 is that in the phase of the addition mode, the count portion 321i for the first digit of the counter 32i is controlled as follows based on the potentials of the comparison results Vco(i) and Vco(i+1) from the two comparators 31i and 31i+1. FIG. 18 shows a relationship of timings for the control.

When both the potentials of the comparison results Vco(i) and Vco(i+1) from the two comparators 31i and 31i+1 are at the "H" level, the addition control portion 33 instructs the count portion 321i for the first digit to carry out the 1-counting operation for counting 1 with one half clock period. In addition, when one of the potentials of the comparison results Vco(i) and Vco(i+1) from the two comparators 31i and 31i+1 are at the "H" level, the addition control portion 33 instructs the count portion 321i for the first digit to carry out the 1-counting operation for counting 1 with one clock period. Moreover, both the potentials of the comparison results Vco(i) and Vco(i+1) from the two comparators 31i and 31i+1 are at the "L" level, the addition control portion 33 instructs the count portion 321i for the first digit to stop the 1-counting operation.

More specifically, when both the potentials of the comparison results Vco(i) and Vco(i+1) from the two comparators 31i and 31i+1 are at the "H" level, the addition control portion 33 instructs the DDR counter 3211 to carry out the 1-counting operation, thereby carrying out the addition for the pixels at double speed (multiple) count. The additional control portion 33 switches the counter for the carrying out the counting operation from the DDR counter 3211 over to the SDR counter 3212 at a time point when one of the potentials of the comparison results Vco(i) and Vco(i+1) from the two comparators 31i and 31i+1 is inverted from the "H" level to the "L" level, thereby carrying out the normal counting operation.

Here, only the count portion 321i for the first digit is made to have the synchronization at the falling, thereby making it possible to prevent the counter for carrying out the counting operation from being switched from the DDR counter 3211 over to the SDR counter 3212 within the same clock. Also, the counting operation of the count portion 321i for the first digit is stopped at a time point when both the potentials of the comparison results Vco(i) and Vco(i+1) from the two comparators 31i and 31i+1 are inverted.

As has been described, when in the horizontal addition mode, both the potentials of the comparison results Vco(i) and Vco(i+1) from the two comparators 31i and 31i+1 are at the "H" level, the count portion 321i for the first digit of the counter 32i is caused to carry out the counting operation at the double speed, thereby making it possible to obtain the following effect. That is to say, since the addition for the pixels in the horizontal direction can be realized without increasing a time period for the AD conversion within the column processing portion 13D, the amount of information horizontally outputted can be reduced to one half while the sensitivity is maintained. As a result, it is possible to realize the enhancement of the frame rate, and the reduction of the power consumption.

It is noted that in Embodiment 4, the first logic is set as the "H" level, and the second logic is set as the "L" level. Also, when the pixel signals Vsig(i) and Vsig(i+1) are each lower in level than the reference signal REF, the comparators 31i and 31i+1 output the comparison results Vco(i) and Vco(i+1) each at the "H" level, and when the pixel signals Vsig(i) and Vsig(i+1) are each higher in level than the reference signal REF, the comparators 31i and 31i+1 output the comparison results Vco(i) and Vco(i+1) each at the "L" level. However, this logic may be inverted. That is to say, a configuration may also be adopted such that when the pixel signals Vsig(i) and Vsig(i+1) are each lower in level than the reference signal REF, the comparators 31i and 31i+1 output the comparison results Vco(i) and Vco(i+1) each at the "L" level (first logic), and when the pixel signals Vsig(i) and Vsig(i+1) are each higher in level than the reference signal REF, the comparators 31i and 31i+1 output the comparison results Vco(i) and Vco(i+1) each at the "H" level (second logic).

(Addition for Pixels in Both Horizontal and Vertical Directions)

Although in each of Embodiments 1 to 4 described above, basically, the addition for the pixels in the horizontal direction has been described so far, the addition for the pixels in the horizontal direction and the addition for the pixels in the vertical direction are used in combination, thereby making it possible to realize the further enhancement of the frame rate. FIG. 19 shows a relationship between the comparators 31i and 31i+1, and the pixels when the addition for the (2×2) pixels in both the horizontal and vertical directions is carried out. As shown in the figure, in the case of being color compatible, one comparator 31 is provided so as to correspond to two pixel columns as a unit. Thus, two sets of pixel columns are suitably switched over to each other by change-over switches SWi and SWi+1 provided between the two sets of pixel columns, and the comparators 31i and 31i+1, respectively.

Hereinafter, a processing procedure when the addition for the pixels in both the horizontal and vertical directions is carried out will be described with reference to a flow chart of FIG. 20.

Firstly, the counters 32i and 32i+1 are initialized (step S11). Next, pixels B22 and B42 are connected to the comparators 31i and 31i+1 by the change-over switches SWi and SWi+1, respectively, and dark signal information from the pixels B22 and B42 is read out to the vertical signal line 17 (Step S12). Next, a sum of the dark signal information from the pixels B22 and B42 is AD-converted, and subtraction is carried out for the counter 32i (Step S13). Next, the pixels B22 and B42 are connected to the comparators 31i and 31i+1 by the switches SWi and SWi+1, respectively, and luminance information from the pixels B22 and B42 is read out to the vertical signal line 17 (Step S14). Next, a sum of the luminance information from the pixels B22 and B42 is AD-converted, and addition is carried out for the counter 32i (Step S15).

Next, the pixels B24 and B44 are connected to the comparators 31i and 31i+1 by the switches SWi and SWi+1, respectively, and dark signal information from the pixels B24 and B44 is read out to the signal line 17 (Step S16). Next, a sum of the dark signal information from the pixels B24 and B44 is AD-converted, and subtraction is carried out for the counter 32i (Step S17). Next, the pixels B24 and B44 are connected to the comparators 31i and 31i+1 by the switches SWi and SWi+1, respectively, and luminance information from the pixels B24 and B44 is read out to the vertical signal line 17 (Step S18). Next, a sum of luminance information from the pixels B24 and B44 is AD-converted, and addition is carried out for the counter 32i (Step S19).

After that, the resulting information is transferred to the outside of the column processing portion 13 (Step S20). When the column processing portion 13D includes a latch for holding therein a storage state while the horizontal transfer is waited for, parallel processing for the processing process becomes possible. That is to say, the process from the process for initializing the counters 32i and 32i+1 to the process for AD-converting the sum of the luminance information from the pixels B24 and B44, and carrying out the addition for the counter 32i (Steps S11 to S19), and the process for transferring the resulting information to the outside (Step S20) can be processed in parallel with each other. The frame rate can be made higher in the case where the parallel processing is executed in such a manner than in the case where no parallel processing is executed.

From the foregoing, the addition for the pixels in both the horizontal and vertical directions can be realized for the vertical signal line 17 by a combination with the related technique of the addition for the pixels in the vertical direction (for example, the technique disclosed in Patent Document 1). This technique can be readily expanded to addition for (3×3) pixels in both horizontal and vertical directions, or the like. In addition, this technique can be combined with a technique of addition for pixels in a vertical direction based on accumulation of the electric charges from a plurality of pixels in floating diffusion within a pixel. In this case as well, it is possible to realize the addition for the pixels in both the horizontal and vertical directions.

In the above, although the description has been focused on the case where the addition for the pixels made under the control by the addition control portion 33 is carried out, of course, the CMOS image sensor according to an embodiment of the present invention can also be applied to the case where no addition for the pixels is carried out. Also, when no addition for the pixels is carried out, with regard to the control signals COB0, COB1 and COB2 outputted from the addition control portion 33, a relationship of COB0=Vco(i), COB1="L" level, and COB2=Vco(i+1) is established. That is to say, the relationship of COB0=Vco(i), COB1="L" level, and COB2=Vco(i+1) is established, whereby the processing when no addition for the pixels is carried out is executed.

It should be noted that although the control signals COB0, COB1 and COB2 need to be switched between the case where the addition for the pixels is carried out and the case where no addition for the pixels is carried out, a circuit for switching the control signals COB0, COB1 and COB2 is omitted here for the sake of simplicity of the description.

[Change]

Each of Embodiments 1 to 4 has been described by giving the case where the present invention is applied to the CMOS image sensor in which the unit pixels each adopted to detect the signal charges corresponding to the light quantity of the visible light as the physical quantity are disposed in the matrix as the example. However, the present invention is by no means limited to the application to the CMOS image sensor, and thus can be applied to the general solid-state image pickup device, utilizing the column system, in which the column processing portion is disposed every pixel column of the pixel array portions.

Moreover, the present invention can be applied not only to the solid-state image pickup device in which the pixels of the pixel array portion are successively scanned and selected in columns, and the signals are read out from the pixels belonging to the selected column, respectively, but also to the X-Y address type solid-state image pickup device in which arbitrary pixels are selected in pixels, and signals are read out from the selected pixels in pixels, respectively.

It should be noted that the solid-state image pickup device may be formed in the form of one-chip or may have a module-like form, having an image capturing function, in which an image pickup portion, and a signal processing portion or an optical system are collectively packaged.

In addition, the present invention is by no means limited to the application to the solid-state image pickup device, and thus can be applied to an image pickup apparatus as well. Here, the image pickup apparatus means the camera system such as the digital still camera or the video camera, or the electronic apparatus, having the image capturing function, such as the mobile phone. It should be noted that the module-like form mounted to the electronic apparatus, that is, the camera module is said as the image pickup apparatus in some cases.

[Image Pickup Apparatus]

FIG. 21 is a block diagram showing a configuration of an image pickup apparatus according to an embodiment of the present invention. As shown in FIG. 21, the image pickup apparatus 100 according to an embodiment of the present invention includes an optical system having a lens group 101 and the like, an image pickup device 102, a DSP circuit 103 as a camera signal processing circuit, a frame memory 104, a display device 105, a recording device 106, a manipulation system 107, a power source system 108, and the like. Also, the DSP circuit 103, the frame memory 104, the display device 105, the recording device 106, the manipulation system 107, and the power source system 108 are connected to one another through a bus line 109.

The lens group 101 captures an incident light (image light) from an object to image the incident light on an imaging area of the image pickup element 102. The image pickup element 102 converts the light quantity of the incident light imaged on the imaging area by the lens group 101 into electrical signals in pixels, and outputs the resulting electrical signals as pixel signals. The CMOS image sensor having the column processing portion in any of Embodiments 1 to 4 described above is used as the image pickup element 102.

The display device 105 is composed of a panel type display device such as a liquid crystal display device or an organic electro luminescence (EL) display device, and displays thereon a moving image or a still image captured by the image pickup element 102. The recording device 106 records image data on the moving image or the still image captured by the image pickup element 102 in a recording medium such as a video tape or a Digital Versatile Disk (DVD).

The manipulation system 107 issues manipulation commands about various kinds of functions, which the image pickup apparatus 100 has, under the manipulations made by a user. The power source system 108 suitably supplies various kinds of power sources as operation power sources for the DSP circuit 103, the frame memory 104, the display device 105, the recording device 106, and the manipulation system 107 to those objects for supply.

The present application contains subject matter related to that disclosed in Japanese Priority Patent Application JP 2008-161415 filed in the Japan Patent Office on Jun. 20, 2008, and Japanese Priority Patent Application JP 2008-260302 filed in the Japan Patent Office on Oct. 7, 2008, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device, comprising:
a plurality of pixels including a first pixel configured to output a first analog signal, and a second pixel configured to output a second analog signal;
a plurality of comparators including a first comparator configured to compare the first analog signal with a reference signal and output a first comparison result, and a second comparator configured to compare the second analog signal with the reference signal and output a second comparison result;
a first counter;
a second counter; and
an addition control circuit electrically connected to the plurality of comparators, the first counter, and the second counter, the addition control circuit configured to
receive at least a control signal, the first comparison result, and the second comparison result,
determine whether the control signal is indicative of an activation state,
output the first comparison result and the second comparison result to the first counter in response to determining that the control signal is indicative of the activation state, and
output the first comparison result to the first counter and the second comparison result to the second counter in response to determining that the control signal is not indicative of the activation state.

2. The solid-state imaging device according to claim 1, wherein:
the plurality of pixels are arranged in a matrix;
the first pixel is disposed in a first column of the matrix; and
the second pixel is disposed in a second column of the matrix.

3. The solid-state imaging device according to claim 2, wherein the first column and the second column are adjacent to one another.

4. The solid-state imaging device according to claim 1, wherein the addition control circuit is further configured to perform an addition operation on the first comparison result and the second comparison result.

5. The solid-state imaging device according to claim 1, further comprising a third counter that is electrically connected to the addition control circuit, wherein
the plurality of pixels includes a third pixel configured to output a third analog signal,
the plurality of comparators includes a third comparator configured to compare the third analog signal with the reference signal and output a third comparison result, and
the addition control circuit is further configured to
receive the third comparison result,
output the third comparison result to the first counter in response to determining that the control signal is indicative of the activation state, and
output the third comparison result to the third counter in response to determining that the control signal is not indicative of the activation state.

6. The solid-state imaging device according to claim 5, wherein:
the plurality of pixels are arranged in a matrix;
the first pixel is disposed in a first column of the matrix;
the second pixel is disposed in a second column of the matrix; and
the third pixel is disposed in a third column of the matrix,
wherein the first column and the second column are adjacent to one another, and the second column and the third column are adjacent to one another.

7. The solid-state imaging device according to claim 6, wherein the addition control circuit is further configured to perform an addition operation on two of the first comparison result, the second comparison result, and the third comparison result.

8. The solid-state imaging device according to claim 6, wherein the addition control circuit is further configured to perform an addition operation on all of the first comparison result, the second comparison result, and the third comparison result.

9. The solid-state imaging device according to claim 1, wherein respective ones of the plurality of pixels include a photoelectric conversion element and a plurality of transistors.

10. The solid-state imaging device according to claim 1, wherein the reference signal has a ramp-like waveform.

11. An electronic apparatus, comprising:
an optical system; and
a solid-state imaging device including:
a plurality of pixels including a first pixel configured to output a first analog signal, and a second pixel configured to output a second analog signal,
a plurality of comparators including a first comparator configured to compare the first analog signal with a reference signal and output a first comparison result, and a second comparator configured to compare the second analog signal with the reference signal and output a second comparison result,
a first counter,
a second counter, and
an addition control circuit electrically connected to the plurality of comparators, the first counter, and the second counter, the addition control circuit configured to
receive a control signal, the first comparison result, and the second comparison result,
determine whether the control signal is indicative of an activation state,
output the first comparison result and the second comparison result to the first counter in response to determining that the control signal is indicative of the activation state, and
output the first comparison result to the first counter and the second comparison result to the second counter in response to determining that the control signal is not indicative of the activation state.

12. The solid-state imaging device according to claim 11, wherein:
the plurality of pixels are arranged in a matrix;
the first pixel is disposed in a first column of the matrix; and
the second pixel is disposed in a second column of the matrix.

13. The solid-state imaging device according to claim 12, wherein the first column and the second column are adjacent to one another.

14. The solid-state imaging device according to claim 11, wherein the addition control circuit is configured to perform an addition operation on the first comparison result and the second comparison result.

15. The solid-state imaging device according to claim 11, further comprising a third counter that is electrically connected to the addition control circuit, wherein
the plurality of pixels includes a third pixel configured to output a third analog signal,
the plurality of comparators includes a third comparator configured to compare the third analog signal with the reference signal and output a third comparison result, and
the addition control circuit is further configured to
receive the third comparison result,
output the third comparison result to the first counter in response to determining that the control signal is indicative of the activation state, and
output the third comparison result to the third counter in response to determining that the control signal is not indicative of the activation state.

16. The solid-state imaging device according to claim 15, wherein:
the plurality of pixels are arranged in a matrix;
the first pixel is disposed in a first column of the matrix;
the second pixel is disposed in a second column of the matrix; and
the third pixel is disposed in a third column of the matrix,
wherein the first column and the second column are adjacent to one another, and the second column and the third column are adjacent to one another.

17. The solid-state imaging device according to claim 16, wherein the addition control circuit is configured to perform an addition operation on two of the first comparison result, the second comparison result, and the third comparison result.

18. The solid-state imaging device according to claim 16, wherein the addition control circuit is configured to perform an addition operation on all of the first comparison result, the second comparison result, and the third comparison result.

19. The solid-state imaging device according to claim 11, wherein respective ones of the plurality of pixels include a photoelectric conversion element and a plurality of transistors.

20. The solid-state imaging device according to claim 11, wherein the reference signal has a ramp-like waveform.

21. A solid-state imaging device comprising:
- a plurality of pixels including a first pixel configured to output a first analog signal, and a second pixel configured to output a second analog signal;
- a plurality of comparators including a first comparator configured to compare the first analog signal with a reference signal and output a first comparison result, and a second comparator configured to compare the second analog signal with the reference signal and output a second comparison result;
- a first counter;
- a second counter; and
- an addition control circuit electrically connected to the plurality of comparators, the first counter, and the second counter, the addition control circuit configured to selectively provide the first comparison result to the first counter and the second counter,
- wherein the second counter is configured to receive the second comparison result through the addition control circuit.

* * * * *